United States Patent
Aghdaie et al.

(10) Patent No.: US 9,993,735 B2
(45) Date of Patent: Jun. 12, 2018

(54) MULTIPLAYER VIDEO GAME MATCHMAKING OPTIMIZATION

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 23 days.

(21) Appl. No.: 15/064,115

(22) Filed: Mar. 8, 2016

(65) Prior Publication Data

US 2017/0259178 A1    Sep. 14, 2017

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2018.01) | |
| A63F 13/73 | (2014.01) | |
| A63F 13/795 | (2014.01) | |
| A63F 13/75 | (2014.01) | |

(52) U.S. Cl.
CPC .............. *A63F 13/73* (2014.09); *A63F 13/75* (2014.09); *A63F 13/795* (2014.09)

(58) Field of Classification Search
CPC ....................... A63F 2300/5566; A63F 13/795

USPC ........................................................ 463/42
See application file for complete search history.

(56) References Cited

U.S. PATENT DOCUMENTS

| | | |
|---|---|---|
| 5,813,913 A | 9/1998 | Berner et al. |
| 5,894,556 A | 4/1999 | Grimm et al. |
| 5,961,386 A | 10/1999 | Sawaguchi |
| 5,964,660 A | 10/1999 | James et al. |
| 6,012,096 A | 1/2000 | Link et al. |
| 6,023,729 A | 2/2000 | Samuel et al. |
| 6,038,599 A | 3/2000 | Black et al. |
| 6,128,660 A | 10/2000 | Grimm et al. |

(Continued)

OTHER PUBLICATIONS

Lee et al; Adaptive Server Selection for Large Scale Interfactive Online Games. ACM Press, 2004.

(Continued)

*Primary Examiner* — Kevin Y Kim
(74) *Attorney, Agent, or Firm* — Knobbe, Martens, Olson & Bear, LLP

(57) ABSTRACT

Embodiments of systems presented herein may identify users to include in a match plan. A parameter model may be generated to predict the retention time of a set of users. A queue of potential users, a set of teammates, and/or opponents may be selected from a queue of waiting users. User information for the set of teammates and/or opponents may be provided to the parameter model to generate a predicted retention time. The set of teammates and/or opponents may be approved if the predicted retention time meets a predetermined threshold. Advantageously, by creating a match plan based on retention rates, the engagement and/or retention level for a number of users may be improved compared to existing multiplayer matching systems.

9 Claims, 12 Drawing Sheets

(56) References Cited

U.S. PATENT DOCUMENTS

| | | | |
|---|---|---|---|
| 6,322,451 B1 | 11/2001 | Miura | |
| 6,641,481 B1 | 11/2003 | Mai et al. | |
| 6,699,125 B2 | 3/2004 | Kirmse et al. | |
| 6,755,743 B1 | 6/2004 | Yamashita et al. | |
| 7,031,473 B2 | 4/2006 | Morais et al. | |
| 7,169,051 B1 | 1/2007 | Mossbarger | |
| 7,240,093 B1 | 7/2007 | Danieli et al. | |
| 7,264,243 B2 | 9/2007 | Yoseloff et al. | |
| 7,288,028 B2 | 10/2007 | Rodriguez et al. | |
| 7,430,719 B2 | 9/2008 | Pettinati et al. | |
| 7,470,197 B2 | 12/2008 | Massey et al. | |
| 7,549,125 B2 | 6/2009 | Dunn et al. | |
| 7,636,719 B2 | 12/2009 | Thompson et al. | |
| 8,360,845 B1 | 1/2013 | Hsu | |
| 8,782,121 B1 | 7/2014 | Chang | |
| 8,882,588 B2* | 11/2014 | Buhr | A63F 13/10 |
| | | | 463/29 |
| 9,199,173 B2 | 12/2015 | Jensen | |
| 9,630,113 B1 | 4/2017 | Jensen | |
| 9,776,091 B1 | 10/2017 | Lebrun et al. | |
| 2001/0044339 A1 | 11/2001 | Cordero et al. | |
| 2002/0037767 A1 | 3/2002 | Ebin | |
| 2002/0086732 A1 | 7/2002 | Kirmse et al. | |
| 2002/0195775 A1 | 12/2002 | Webb et al. | |
| 2003/0236878 A1 | 12/2003 | Egi | |
| 2004/0097287 A1 | 5/2004 | Postrel | |
| 2004/0116186 A1 | 6/2004 | Shim et al. | |
| 2004/0143852 A1 | 7/2004 | Meyers | |
| 2004/0192440 A1 | 9/2004 | Evans et al. | |
| 2004/0215756 A1 | 10/2004 | VanAntwerp et al. | |
| 2004/0248652 A1 | 12/2004 | Massey et al. | |
| 2004/0255032 A1 | 12/2004 | Danieli | |
| 2005/0033601 A1 | 2/2005 | Kirby et al. | |
| 2005/0181878 A1 | 8/2005 | Danieli et al. | |
| 2005/0192097 A1 | 9/2005 | Farnham et al. | |
| 2006/0121990 A1 | 6/2006 | O'Kelley, II et al. | |
| 2006/0217167 A1 | 9/2006 | Jubinville et al. | |
| 2006/0247055 A1 | 11/2006 | O'Kelley, II et al. | |
| 2006/0258463 A1 | 11/2006 | Cugno et al. | |
| 2006/0287096 A1 | 12/2006 | O'Kelley, II et al. | |
| 2006/0287099 A1 | 12/2006 | Shaw et al. | |
| 2007/0035548 A1 | 2/2007 | Jung et al. | |
| 2008/0311981 A1 | 12/2008 | Schugar | |
| 2010/0197405 A1 | 8/2010 | Douceur et al. | |
| 2010/0273557 A1 | 10/2010 | Miyaki | |
| 2011/0252079 A1 | 10/2011 | Werner et al. | |
| 2012/0283021 A1 | 11/2012 | Riego | |
| 2013/0045803 A1 | 2/2013 | Kang et al. | |
| 2013/0165234 A1 | 6/2013 | Hall et al. | |
| 2013/0210527 A1 | 8/2013 | Kim et al. | |
| 2013/0262203 A1 | 10/2013 | Frederick et al. | |
| 2013/0288759 A1 | 10/2013 | Rom et al. | |
| 2014/0274402 A1 | 9/2014 | Michel et al. | |
| 2015/0148127 A1 | 5/2015 | Saraf et al. | |
| 2016/0005270 A1* | 1/2016 | Marr | A63F 13/30 |
| | | | 463/25 |

OTHER PUBLICATIONS

International Search Report Application PCT/US/06/18957 dated Aug. 17, 2007.

Agarwal, S., et al., "Matchmaking for online games and other latency-senstive P2P systems." In ACM SIGCOMM Computer Communication Review, vol. 39, pp. 315-326, ACM, 2009.

Agresti, A., et al., "Categorical Data Analysis." Springer, 2011.

Bell, C. E., Weighted matching with vertex weights: An application to scheduling training sessions in NASA space shuttle cockpit simulators. European Journal of Operational Research, 73(3):443-449, 1994.

Berge, C., "Hypergraphs: combinatorics of finite sets", vol. 45. Elsevier, 1984.

Bernhaupt, R., "User experience evaluation in entertainment. In Evaluating User Experience in Games", pp. 3-7. Springer, 2010.

Bradley, R. A., et al., "Rank analysis of incomplete block designs: I. The method of paired comparisons." Biometrika, 39(3/4):324-345, 1952.

Delalleau, E., et al., "Beyond Skill Rating: Advanced Matchmaking in Ghost Recon Online." IEEE Transactions on Computational Intelligence and AI in Games, 4(3):167-177, Sep. 2012.

Drake, D. E., et al., "A simple approximation algorithm for the weighted matching problem." Information Processing Letters, 85(4):211-213, 2003.

Duan, R., et al., "Linear-time approximation for maximum weight matching." Joural of the ACM (JACM), 61(1):1, 2014.

Edmonds, J., "Maximum matching and a polyhedrum with 0, 1-vertices." J. Res. Nat. Bur. Standards B, 69(1965):125-130, 1965.

Edmonds, J., "Paths, trees, and flowers." Canadian Journal of Mathematics, 17(3):449-467, 1965.

Elo, A. E., "The rating of chessplayers, past and present." Arco Pub., 1978.

Ferreira, J., et al., "Data mining techniguques on the evaluation of wireless churn." In ESANN, pp. 483-488, 2004.

Gabow, H. N., "Implementation of algoritms for maximum matching on nonbipratite graphs." 1974.

Gabow, H. N., "A scaling algoritm for weighted matching on general graphs." In Foundations of Computer Science, 1985., 26the Annual Symposium on, pp. 90-100, IEEE, 1985.

Glickman, M. E., "Parameter estimation in large dynamic paired comparison experiments." Applied Statistics, pp. 377-394, 1999.

Grapel, T., et al., "Ranking and Matchmaking." Game Developer Magazine, 25:34, 2006.

Hadiji, F., et al., "Predicting player chrun in the wild." In 2014 IEEE Conference on Computational Intelligence and Games, pp. 1-8, IEEE, 2014.

Herbrich, R., et al., "Trueskill: A bayesian skill rating system." pp. 569-576. Advances in Neural Information Processing Systems, 2006.

Huang, T.-K., et al., A generalized Bradley-Terry model: From group competition to individual skill. In Advances in Neural Information Processing Systems, pp. 601-608, 2004.

Jimenez-Rodriguez, J., et al., Matchmaking and case-based recommendations. 2011.

Lawler, E. L., "Combinatorial Optimization: Networks and Matroids." Courier Corporation, 2001. (Part 1 of 2).

Lawler, E. L., "Combinatorial Optimization: Networks and Matroids." Courier Corporation, 2001. (Part 2 of 2).

Lee, Y., et al., "Measurement and estimation of network QoS among peer Xbox 360 game players." In International Conference on Passive and Active Network Measurement, pp. 41-50. Springer, 2008.

Manweiler, S., et al., "Switchboard: a matchmaking system for multiplayer mobile games." In Proceedings of the 9th international conference on Mobile systems, applications, and services, pp. 71-84. ACM, 2011.

Menke, J. E., et al., "A Bradley-Terry artificial neural network model for individual ratings in gropu competitions." Neural computing and Applications, 17(2): 175-186, 2008.

Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.

Morik, K., et al., "Analysing customer churn in insurance date—a case study." In European Conferecne on Principles of Data Mining and Knowledge Discovery, pp. 325-336. Springer, 2004.

Myslak. M., et al., "Developing game-structure sensitive matchmaking system for massive-multiplayer online games." In Social Informatics, pp. 200-208. Springer, 2014.

Nguyen, T.-H. D., et al., "Analytics-based AI Techniques for Better Gaming Experience", vol. 2 of Game AI Pro. CRC Press, Boca Raton, Florida, 2015.

Olafsson, S., "Weighted matching in chess tournaments." Journal of the Operational Research Society, 41(1): 17-24, 1990.

Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.

(56) References Cited

OTHER PUBLICATIONS

Riskin, E. A., et al., Index assignment for progressive transmission of full-search vector quantization. IEEE Transactions on Image Processing, 3(3):307-312, 1994.
Runge, J., et al., "Churn prediction for high-value players in casual social games." In 2014 IEEE Conference on Computational Intelligence and Games, pp. 1-8, IEEE, 2014.
SuperData. eSports market brief: US accounts for almost half of total viewership. https://www.superdataresearch.com/blog/esports/-brief/, 2016. Online; accessed Mar. 2016.
Tassi, P., Riot's League of Legends' Reveals Astonishing 27 Million Daily Players, 67 Million Monthly. Http://www.forbes.com/sites/insertcoin/2014/01/27/riots-league-of-legends-reveals-astonishing-27-million-daily-players-67-million-monthly/#26ff8e543511, 2016. Online; accessed May 2016.
Van Rantwijk, J., "Maximum Weighted Matching." http://jorisvr.nl/article/maximum-matching, 2013. Online; accessed May 2016.
Weber, B. G., et al., Modeling player retention in madden nfl 11. In IAAI. 2011.
Yannakakis, G., et al., Player Modeling. In Artificial and Computational Intelligence in Games, pp. 45-59. 2013.
Yoon, S., et al., Prediction of advertiser churn for google adwords. 2010.

\* cited by examiner

MULTIPLAYER VIDEO GAME MATCHMAKING OPTIMIZATION

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

The principle of engagement is not limited to single player games and can also be applied to multiplayer video games. Video games that provide users with enjoyable multiplayer experiences are more likely to have users play them again. Conversely, video games that provide users with poor multiplayer experiences are less likely to maintain a high number of users. Thus, one of the challenges of video game development is to provide a mechanism that ensures or increases the probability of an enjoyable multiplayer experience.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments, a computer-implemented method is disclosed that may be implemented by an interactive computing system configured with specific computer-executable instructions to at least select a plurality of users from a queue of users waiting to play an instance of a video game. At least a first portion of the instance of the video game may execute on a user computing device of at least one user from the queue of users and a second portion of the instance of the video game may execute on the interactive computing system. For each user from the plurality of users, the method may include accessing a set of input data associated with the corresponding user. The set of input data may comprise user interaction data associated with the corresponding user's interaction with the video game. Additionally, the method may include determining a predicted retention rate for each user from the plurality of users based at least in part on the set of input data for each user from the plurality of users. The predicted retention rate may indicate an amount of time each user from the plurality of users will play the video game. Moreover, the method may include determining whether the predicted retention rates of the plurality of users satisfy a retention threshold. In response to the predicted retention rates satisfying the retention threshold, the method may include initiating the instance of the video game with the plurality of users as players of the instance of the video game.

In some embodiments, in response to the predicted retention rates failing to satisfy the retention threshold, the computer-implemented method further comprises selecting a new plurality of users from the queue of users waiting to play the instance of the video game. Further, at least one user from the plurality of users may be included with the new plurality of users. In some cases, the plurality of users comprises a subset of users included in the queue of users. Further, the plurality of users may be selected based on one or more selection criteria. The selection criteria may include one or more of the following: length of time of a user in the queue; geographic location of the user; inclusion on a blacklist of the user; geographic distance from a host server of the interactive computing system that hosts the second portion of the instance of the video game; or network distance from the host server.

For some embodiments, determining the predicted retention rate for each user from the plurality of users may include providing, for each user from the plurality of users, the set of input data to a parameter function. The parameter function may be generated based at least in part on a machine learning algorithm. Moreover, the method may include determining the predicted retention rate for each user from the plurality of users based at least in part on an output of the parameter function. In some cases, generating the parameter function may include at least accessing training input data. The training input data associated with a second plurality of users who play the video game. Further, the method may include accessing a set of output data for the second plurality of users. The output data may be associated with a retention rate for the second plurality of users. In addition, the method may include using the machine learning algorithm to determine the parameter function based at least in part on the set of input data and the set of output data. Furthermore, the method may include associating a penalty with the parameter function based at least in part on one or more of the following: a number of variables included in the parameter function; a complexity of a mathematical algorithm associated with the parameter function; or an accuracy of an output of the parameter function compared to the output data. In some cases, the method may include selecting the parameter function from a plurality of parameter functions based at least in part on a penalty value associated with at least some of the parameter functions from the plurality of parameter functions.

With some embodiments, the method may include receiving an indication that a first user and a second user from the plurality of users desire to play the same instance of the video game. In response to the predicted retention rate failing to satisfy the retention threshold, the method may include replacing at least some of the plurality of users with different users while maintaining the first user and the second user within the plurality of users. In some cases, the user interaction data includes one or more of the following: a play style; a skill level; a character selection history; or a role history. Further, the method may include associating a particular set of user interaction data with a user from the plurality of users in response to determining that the user is associated with less than a threshold amount interaction history with the video game.

In certain embodiments of the present disclosure, a system comprising an electronic data store configured to store user interaction data for users of a video game is disclosed. The system can further include a hardware processor in communication with the electronic data store. The hardware processor may be configured to execute specific computer-executable instructions to at least select a set of users from a queue of users waiting to play a video game. At least a first portion of the video game may be hosted on a user computing device of at least one user from the queue of users and a server portion of the video game may be hosted by a server system. In addition, the system may generate a match plan based on the set of users. Each match plan may comprise a first team of users from the set of users and a second team of users from the set of users. For each user from the set of users, the system can access a set of user interaction data associated with the user. This set of user interaction data may be accessed from the electronic data store. In addition, the system can determine an engagement score for the match plan based at least in part on the set of user interaction data associated with each of the users from the set of users. The system may also determine whether the engagement score satisfies an engagement score threshold. In response to determining that the engagement score satisfies the engagement score threshold, the system can initiate an instance of the video game using the match plan.

In some embodiments, the match plan may be one of a plurality of match plans. Further, the hardware processor may be further configured to execute specific computer-executable instructions to at least select the match plan from the plurality of match plans based at least in part on each match plans engagement score. In response to determining that the engagement score does not satisfy the engagement score threshold, the hardware processor may be further configured to execute specific computer-executable instructions to at least substitute at least one user from the set of users with another user from the queue of users. In some cases, at least a first user and a second user are designated as a user pair, and substituting at least one user from the set of users with another user from the queue of users may include maintaining the user pair. In some cases, the engagement score threshold varies based at least in part on the number of users included in the queue of users.

Certain embodiments disclosed herein relate to a non-transitory computer-readable storage medium storing computer executable instructions that, when executed by one or more computing devices, configure the one or more computing devices to perform operations comprising selecting a plurality of users from a queue of users waiting to play an instance of a video game to form a match plan for playing an instance of the video game. For each user from the plurality of users, the operations may include accessing a set of user interaction data associated with the user's interaction with the video game. Moreover, the operations may include determining a predicted retention rate the match plan based at least in part on the set of user interaction data for each of the plurality of users. The predicted retention rate may correspond to a probability that a particular number of users from the plurality of users cease to play the video game. Furthermore, the operations may include determining whether the predicted retention rate satisfies a retention threshold. In response to the predicted retention rate satisfying the retention threshold, the operations may include selecting the match plan to play the instance of the video game.

In some embodiments, determining the predicted retention rate can include providing the set of user interaction data for each user of the match plan to a parameter function generated based at least in part on a machine learning algorithm. The operations may further include determining the predicted retention rate for the match plan based at least in part on an output of the parameter function. In some cases, the output of the parameter function comprises the predicted retention rate for the match plan and an identity of a number of users associated with retention rates that do not satisfy a second retention threshold. The retention threshold and the second retention threshold may differ in some cases.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
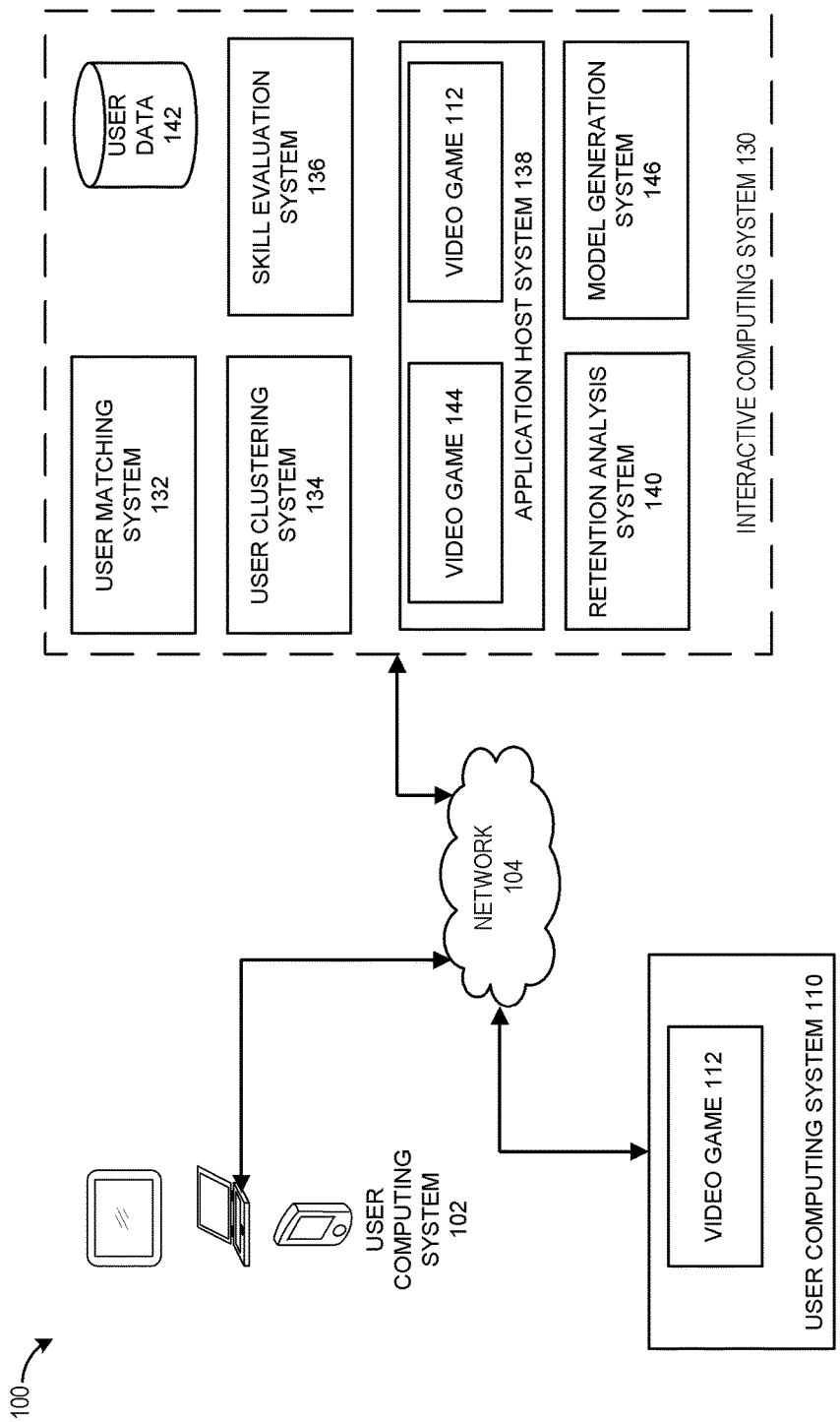
FIG. 1A illustrates an embodiment of a networked computing environment that can implement one or more embodiments of a dynamic user matchmaking system for a video game.

It is generally desirable for a video game to appeal to a large number of users. This principle is also true for multiplayer video games. Multiplayer video games can include video games where two users (or more) play against each other, video games where two users (or more) play on the same team, and video games where teams of multiple users play against each other.

Multiplayer games with poor matchmaking algorithms can result in lower engagement by users. In other words, poorly matched opponents and/or teammates may result in users ceasing to play a video game or playing the video game less often than if the multiplayer game has better matchmaking algorithms. Poor matchmaking may include, among other things, matching users of different skill levels or different play style preferences.

Embodiments presented herein use machine learning algorithms to determine the impact that a match plan for a multiplayer video game is likely to have on the retention for the individual users included in the match plan. Further, certain embodiments herein relate to determining whether a grouping of two or more players as teammates and/or opponents may result in one of the players being more likely to cease playing the video game. Systems presented herein can use a parameter function or a prediction model to predict or estimate a churn or retention rate for users based at least in part on the configuration of particular match plans and user interaction data for the users relating to interaction with the video game by the users. The match plan may include the identification of the number of users and/or teams, the number of users on a team, and whether two (or more) users are teammates or opponents, and one or more roles of each user within the video game, or match. The roles may include the identity of in-game or playable characters used by the users and/or the role of the playable character, such as an offense character (such as a forward in a soccer game), a defense character (such as a cornerback in a football game), a tank character (or a character that is designed to withstand a lot of in-game damage), a healer character, a range character, a side-kick, and the like.

In some embodiments, historical user information is fed into a machine learning system to generate a prediction model that predicts an expected duration of game play, such as for example, an expected churn rate, a retention rate, the length of time a user is expected to play the game, or an indication of the user's expected game play time relative to a historical set of users who have previously played the game. During a matchmaking process, the prediction model is applied to information about the user and other users who are matched with the user as opponents and/or teammates to predict the user's expected duration of game play using the identified match plan. Based on the expected duration, the system may determine whether to initiate an instance of the game with the selected match plan or to generate a new match plan. In some embodiments, the prediction model is applied individually to each user. In some such embodiments, a match plan may be generated based at least in part on the result of the application of the prediction model to each individual user.

Certain additional embodiments presented herein include a system and method for identifying one or more of opponent preferences and teammate preferences for different groups of users who play a particular video game. Users may be grouped into different clusters based on their opponent and/or teammate preferences. The different clusters may be determined by using one or more machine learning algorithms to analyze user interaction data over a time period for a group of users to identify different types of opponent and/or teammate preferences. For example, the machine learning algorithms may determine that some groups of users prefer opponents and/or teammates with particular skill levels and/or with particular play styles. Further, the machine learning algorithms may identify relationships between particular characteristics of the users and particular preferences of the users. For example, the machine learning algorithms may determine that some users with lower levels of skill prefer to play with other users of correspondingly low levels of skill to enable the users to participate equally in the game. However, the machine learning algorithms may determine that some other users with lower levels of skill prefer to play with other users with higher levels of skill to increase the learning opportunities and/or the chances of winning. As noted above and further herein, additional or alternative embodiments described herein may determine one or more match plans for initiating a multiplayer instance of a video game by using one or more parameter functions or prediction models. In some cases, the prediction models may be combined with clustering. In other embodiments, the prediction models may be used instead of clustering.

Further, in certain embodiments described herein, a user may be grouped with one or more user clusters based at least in part on a similarity between the user's opponent and/or teammate preferences and the preferences associated with each of the user clusters. The determination of the user's opponent and/or teammate preferences may be determined by analyzing user interaction information with respect to the video game. For example, if an analysis of the user interaction information of the user indicates that the user tends to play the video game with other users that use melee-based characters, but will quit the game or match at a higher than average rate when paired with users that use range-based characters, the user may be associated with a user cluster that indicates a teammate preference for users who use melee-based characters.

Moreover, in certain embodiments described herein, a user may be paired with another user as an opponent or teammate in an instance of the video game based at least in part on the user cluster associated with the user. For example, continuing the previous example, the user may be matched with another user that tends to select melee-based characters when playing the video game. This matchup may be formed regardless of whether the selected user is the next user in a queue of users waiting to play the video game. Advantageously, in certain embodiments, by using machine learning to identify opponent and/or teammate preferences and by using the preference information to select users to group together as teammates or opponents, the engagement and/or retention level of users may be increased compared to other matching systems.

To simplify discussion, the present disclosure is primarily described with respect to a video game. However, the present disclosure is not limited as such may be applied to other types of applications. For example, embodiments disclosed herein may be applied to educational applications (for example, applications that help users learn a new language) or other applications that may pair together two or more users in a group.

Example Networked Computing Environment

FIG. 1A illustrates an embodiment of a networked computing environment 100 that can implement one or more embodiments of a dynamic user matchmaking system for a video game 112. The networked computing environment 100 includes a user computing system 110 that can communicate with an interactive computing system 130 via a network 104. Further, the networked computing environment 100 may include a number of additional user computing systems 102. At least some of the user computing systems 102 may be configured the same as or similarly to the user computing system 110.

User computing system 110 may include, host, or execute a video game 112. In some embodiments, user computing system 110 can host or execute a portion of the video game 112 and the application host system 138 can host and/or execute a portion of the video game 112. When a user initiates execution of the video game 112 on the user computing system 110, a network connection may be established with the interactive computing system 130 and the two portions of the video game 112 may execute in conjunction with each other. For example, the application host system 138 may host and execute a portion of the video game 112 that comprises a video game environment while the user computing system 110 may execute a portion of the video game 112 that enables a user to interact with the video game environment using, for example, a playable in-game character. The video game environment may include an online or digital persistent world that may be maintained after a user of the user computing system 110 disconnects from the application host system 138. As another example, the video game may be a massively multiplayer online role-playing game (MMORPG) that includes a client portion executed by the user computing system 110 and a server portion executed by one or more application host systems (not shown) that may be included as part of the interactive computing system 130.

As previously mentioned, the application host system 138 may host and/or execute at least a portion of the video game 112. Alternatively, or in addition, the application host system 138 may host or execute a video game 144 that may not be hosted or executed by the user computing system 110. However, in some cases, a user may interact with the video game 144 using the user computing system 110.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 9 and FIG. 10.

As previously discussed, it may be desirable to maintain or increase a user's level of engagement with the video game 112. One solution for maintaining or increasing the user's level of engagement with the video game 112 includes matching a user with other users who have play characteristics, or application interactivity characteristics, that the user desires or tends to prefer in opponents and/or teammates. These play characteristics include characteristics relating to skill level, play style (for example, a user who plays defensively, plays offensively, plays a support role, prefers stealth attacks, prefers to use magic abilities, or prefers to use melee abilities, and the like), and/or sportsmanship (for example, a user who is a gracious winner or loser, is gregarious, is not gregarious, or does not insult other users, and the like). It should be noted that although the term play characteristics is used, the play characteristics are not necessarily limited to characteristics related to playing the video game 112. In some embodiments, the play characteristics may include one or more additional or alternative characteristics relating to matching users for a multiplayer game. These additional or alternative characteristics may include characteristics that relate to improving the play experience of users in a multiplayer game. For example, the additional or alternative characteristics may include user geographic location, user location within a network, characteristics of a user computing system 110 of a user, and network characteristics of a portion of a network (such as the last mile, or the home network of the user) in communication with the user computing system 110 of a user, and the like.

The play characteristics may be determined based at least in part on user interaction data for one or more users. Further, the play characteristics that a user desires or tends to prefer in opponents and/or teammates may be determined based at least in part on user interaction data for the user.

Interactive computing system 130 may include a number of systems or subsystems for facilitating the determination of the play characteristics of a particular user of the video game 112 and the desired play characteristics of opponent and/or teammate users for the particular user of the video game 112. Further, the interactive computing system 130 may include a number of systems and subsystems for facilitating matchmaking of users of the video game 112 based at least in part on the play characteristics of the users. These systems or subsystems can include a user matching system 132, a user clustering system 134, a skill evaluation system 136, an application host system 138, a user data repository 142, a retention analysis system 140, and a model generation system 146. Each of these systems may be implemented in hardware, and software, or a combination of hardware and software. Further, each of these systems may be implemented in a single computing system comprising computer hardware or in one or more separate or distributed computing systems. Moreover, while these systems are shown in FIG. 1A to be stored or executed on the interactive computing system 130, it is recognized that in some embodiments, part or all of these systems can be stored and executed on the user computing system 110.

The user matching system 132 identifies or matches two or more users together for playing the video game 112. The two or more users may be matched as opponents, teammates, or a combination of opponents and teammates. To match the plurality of users, the user matching system 132 may access user clusters associated with each of the plurality of users to determine play characteristics of each of the users and/or desired play characteristics of opponents and/or teammates for each of the users. The user clusters may be accessed from the user data repository 142.

The model generation system 146 can use one or more machine learning algorithms to generate one or more prediction models or parameter functions. One or more of these parameter functions may be used to determine an expected value or occurrence based on a set of inputs. For example, a prediction model can be used to determine an expected churn rate or a probability that a user will cease playing the video game 112 based on one or more inputs to the prediction model, such as, for example, historical user interaction information for a user. As another example, a prediction model can be used to determine an expected amount of money spent by the user on purchasing in-game items for the video game based on one or more inputs to the prediction model. In some cases, the prediction model may be termed a prediction model because, for example, the output may be or may be related to a prediction of an action or event, such as the prediction the user continues to play the video game 112. A number of different types of algorithms may be used by the machine learning system 140. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the retention analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The retention analysis system 140 can include one or more systems for determining a predicted churn or retention rate for a user based on the application of user interaction data for the user and user interaction data for additional users included in a match plan to a prediction model generated by the model generation system 140. In some cases, the user matching system 132 may use the predicted retention rate determined by the retention analysis system 140 to determine whether to select the match plan, or to generate a new match plan for playing an instance of the video game 112. In some cases, determining whether to select the match plan includes matching the retention rate to data in a repository (not shown) that indicates whether or not to select a new match plan.

Further, generation and application of the parameter functions or prediction models and their use in creating a match plan or determining whether to select a match plan for playing an instance of the video game 112 will be described in further detail below with respect to the retention analysis system 140. In certain embodiments, the user matching system 132 may be or may include the model generation system 146. Moreover, in some cases, the user matching system 132 may be or may include the retention analysis system 140.

In some embodiments, the retention analysis system 140 may receive a particular match plan and user interaction data, features, and/or metadata associated with each user included in the match plan. The retention analysis system 140 can then output a retention rate and/or a prediction spending amount for each individual user included in the match plan and/or for the match plan itself. For example, the retention analysis system 140 may receive a match plan that includes users A1, A2, and A3 on one team and users B1, B2, and B3 on another team. Using user interaction data for each of the six users, the retention analysis system 140 can determine a retention rate for each user, for the match plan, a predicted amount of spending for each user, and/or a predicted amount of spending in total for the match plan.

As stated above, one non-limiting example of a machine learning algorithm that can be used herein is a clustering algorithm. The user clustering system 134 may facilitate execution of the clustering algorithm. The user clustering system 134 groups or divides a set of users into groups based at least in part on each user's skill level, or other play characteristics, with respect to the video game 112 or other video games accessed by the users. Further, the user clustering system 134 can group or divide a set of users into groups based at least in part on each user's desired play characteristics for opponents and/or teammates. In some cases, users may be associated with a single user cluster is associated with both play characteristics of the user and desired play characteristics for opponents and/or teammates of the user when playing the video game 112. In other cases, users may be associated with multiple user clusters. Some of the user clusters may be associated with the user's play characteristics and some of the user clusters may be associated with the user's desired play characteristics for opponents and/or teammates of the user when playing the video game 112. Alternatively, or in addition, the user clustering system 134 may group or cluster the users based on one or more criteria associated with one or more of the users that impacts the users' engagement level with the video game 112 or other video games accessed by the users.

The skill evaluation system 136 evaluates a skill level of the user accessing or playing the video game 112. The skill level of the user may be determined based at least in part on user interaction data related to the user's access of the video game 112. In some cases, the skill evaluation system 136 may determine a general skill for the user playing the video game 112. In other cases, the skill evaluation system 136 may evaluate a plurality of different skills associated with playing the video game 112. These skills may vary based on the type of video game. For example, in a sports game, the skills may relate to the ability of the user to select the right play, the best play, or best play strategy when playing the video game 112. As a second example, a first-person shooter, the skills may relate to the accuracy of the user in shooting at an enemy within the video game 112. The skill level associated with the user may be a factor in determining a user cluster to associate with the user. Further, the skill level information may be associated with the user at the user data repository 142.

The user data repository 142 can store user interaction information associated with one or more users' interaction with the video game 112 and/or one or more other video games. This user interaction information or data may include any type of information that can be used to determine a user's play characteristics (such as skill level) and a user's desired play characteristics for opponents and/or teammates. Further, the user interaction information may be used to determine the user's level of engagement with the video game 112 when playing with or against users associated with various play characteristics. For example, some non-limiting examples of the user interaction information may include information relating to actions taken by the user within the video game 112; the level of success of the user; a measure of the user's progress within the video game 112; whether the user was successful at performing specific actions within the video game 112 or completing particular objectives within the video game 112; how long it took the user to complete the particular objectives; how many attempts it took the user to complete the particular objectives; how much money the user spent with respect to the video game 112, which may include one or both of the amount of money spent to obtain access to the video game 112 and the amount of money spent with respect to the video game 112 exclusive of money spent to obtain access to the video game 112; how frequently the user accesses the video game 112; how long the user plays the video game 112; whether the user continues playing during a play session after a defeat or failure to satisfy an objective, and the like. Each of these types of user interaction information may be collected, divided, weighted, and/or characterized based at least in part on play characteristics of other users that play with or against the user. For example, the user interaction information relating to the level of success of the user when playing the video game 112 may be weighted or categorized differently based on play characteristics of teammates. For instance, the level of success of the user may be weighted higher or lower based on whether the play characteristics of a teammate indicate that the teammate has a lower or higher skill level than the user.

Generally, the user interaction information may be monitored and/or obtained by systems of the interactive computing system 130. However, in some cases, the user computing system 110 may monitor and/or obtain at least some of the user interaction information. In such cases, the user computing system 110 may share the user interaction information with the interactive computing system 130 via the network 104. In some embodiments, some or all of the user interaction information is not stored by the video game 112, but is instead provided to or determined by another portion of the user computing system 110 external to the video game 112 and/or by the interactive computing system 130. Further, the user data repository 142 can store user cluster information associated with one or more user clusters generated by the user clustering system 134. Each of the repositories described herein may include non-volatile memory or a combination of volatile and nonvolatile memory.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

Figure 1B:
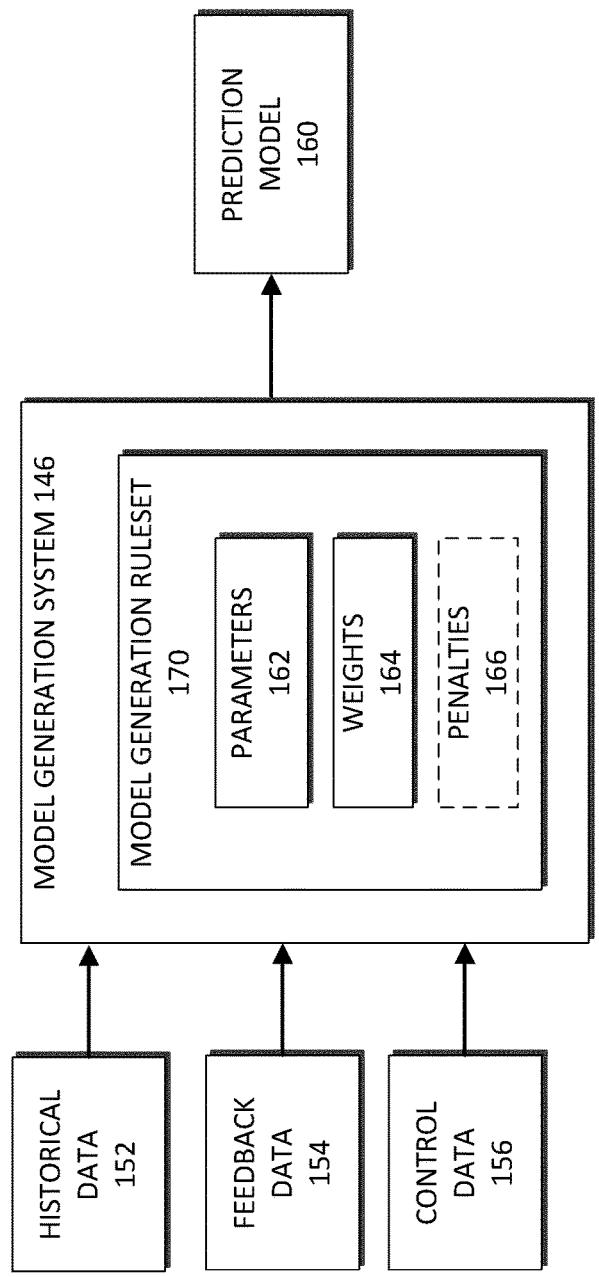
FIG. 1B illustrates an embodiment of a model generation system of FIG. 1A.

FIG. 1B illustrates an embodiment of the model generation system 146 of FIG. 1A. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users. Further, the historical data 152 can include data received from one or more data sources, such as, for example, an application host system (not shown) and/or one or more user computing systems 102. Moreover, the historical data 152 can include data from different data sources, different data types, and any data generated by one or more user's interaction with the video game 112. In some embodiments, the historical data 152 may include a very large number of data points, such as millions of data points, which may be aggregated into one or more data sets. In some cases, the historical data 152 may be accessed from a user data repository 142. In some embodiments, the historical data 152 is limited to historical information about the video game, but in other embodiments, the historical data 152 may include information from one or more other video games. Further, in some embodiments, one or more subsets of the historical data are limited by a date restriction, such as for example, limited to include only data from the last 6 months.

The historical data 152 may include user interaction data for the users with respect to the video game 112. Further, the historical data 152 may include information relating to opponents and/or teammates of the users.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate, opponent data, and/or teammate data for the users whose data is included in the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a churn rate. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, or game account information), opponent data (such as, for example, skill of opponent, role selected or played by opponent, or success rate verse opponent), teammate data (such as, for example, skill of teammates, roles selected or played by teammates, or success rate when playing with a particular teammate) or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation of or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the retention analysis system 140 and/or the user matching system 132 to approve, reject, or select a match plan for playing an instance of the video game 112. In some cases, the prediction model 160 may be used to facilitate generating the match plan. In other cases, the prediction model 160 may be use to confirm whether a particular match plan satisfies a set of conditions, such as, for example, a particular threshold retention rate.

Example Retention Analysis System

Figure 1C:
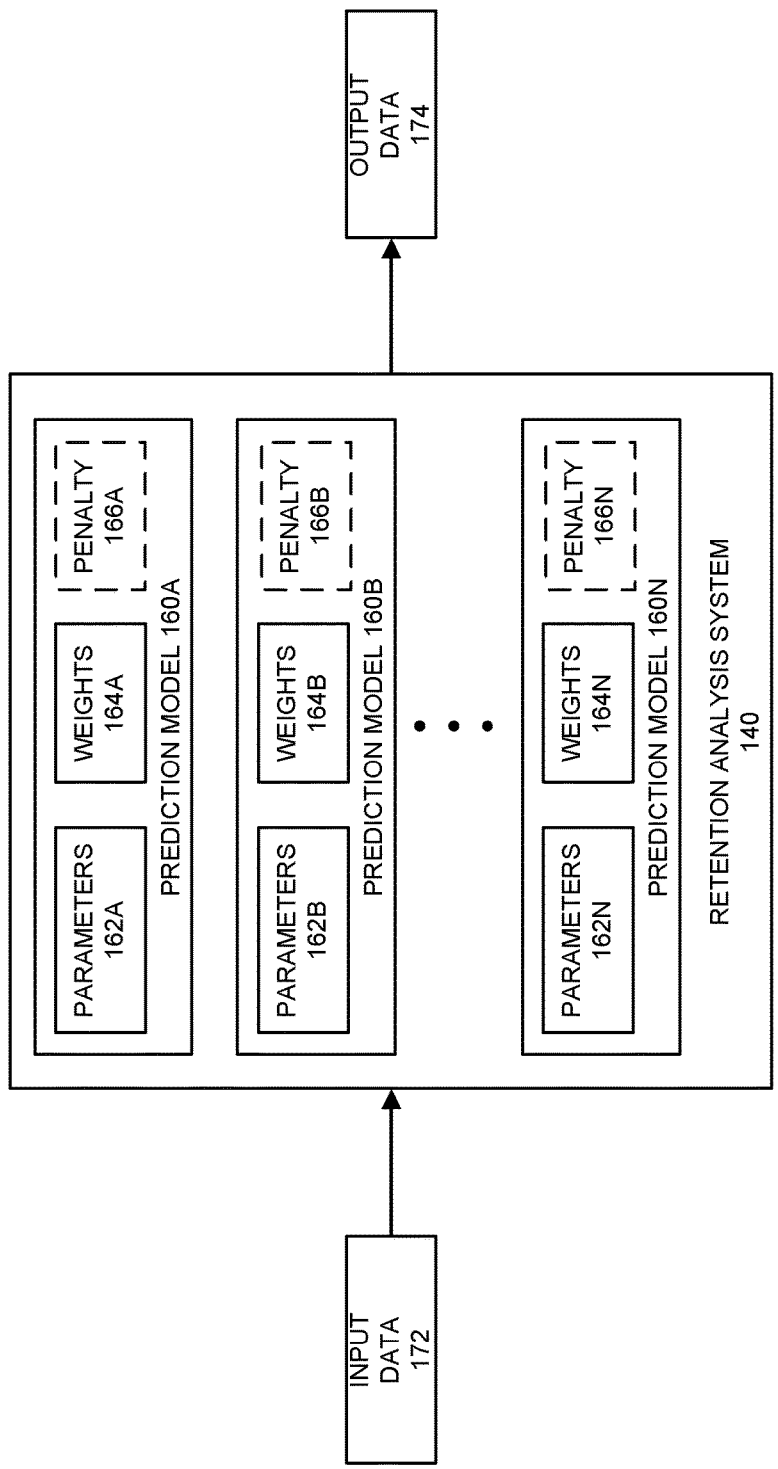
FIG. 1C illustrates an embodiment of a retention analysis system of FIG. 1A.

FIG. 1C illustrates an embodiment of a retention analysis system 140 of FIG. 1A. The retention analysis system 140 can apply or use one or more of the prediction models 160 generated by the model generation system 146. Although illustrated as a separate system, in some cases, the retention analysis system 140 may be included as part of the user matching system 132. The retention analysis system 140 may use one or more prediction models 160A, 160B, 160N (which may be referred to collectively as "prediction models 160" or in the singular as "prediction model 160") to process the input data 172 to obtain the output data 174.

The retention analysis system 140 may apply the prediction model(s) 160 during initiation of game play or a match for a particular instance of the video game 112. In some embodiments, the prediction models 160 are applied at the beginning of the game to generate a match plan or to confirm that the match plan satisfies a particular condition, such as, for example, retention rate or likelihood that the users spend a particular amount of in-game or real-world currency (for example, US dollars or Euros). In other embodiments, the prediction models 160 are applied at different times during the game and/or at different stages in the game. During initiation of an instance of the video game 112 or during selection of a set of users to be teammates and/or opponents, the retention analysis system 140 receives input data 172 that can be applied to one or more of the prediction models 160. The input data 172 can include one or more pieces of data associated with a user who is playing the video game 112 or has indicated a desire to play an instance of the video game 112. This data may include user interaction data for the video game 112, profile data for the user, and any other data that may be applied to the prediction model 160 to determine a retention or churn rate for the user. Further, the input data 172 can include one or more pieces of data associated with one or more additional users who may be selected as opponents and/or teammates of the user. The data associated with the additional users may include the same type of data as received for the user, a subset of the type of data received for the user, and/or additional types of data than that received for the user. In some embodiments, the input data 172 may be filtered before it is provided to the retention analysis system 140.

In some embodiments, a single prediction model 160 may exist for the retention analysis system 140. However, as illustrated, it is possible for the retention analysis system 140 to include multiple prediction models 160. The retention analysis system 140 can determine which detection model, such as any of models 160A-N, to use based on input data 172 and/or additional identifiers associated with the input data 172. Additionally, the prediction model 160 selected may be selected based on the specific data provided as input data 172. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead.

As mentioned above, one or more of the prediction models 160 may have been generated with or may be associated with a penalty 166. The penalty may be used to impact the generation of the model or the selection of a prediction model for use by the retention analysis system 140.

The output data 174 can be a retention rate or churn rate associated with a prediction that a user, or a set of users, ceases to play the video game 112. For example, in some embodiments, the retention rate may be between 0 and 100 indicating the predicted percentage of users associated with similar or the same data as included as input data 172 who would cease to play the video game 112 within a threshold time period. In some cases, the output data 174 may also identify a reason for the retention rate. For example, the retention analysis system 140 may indicate that the 90% retention rate for a particular user is based at least in part on the amount of money spent while playing the video game 112. However, the retention analysis system 140 may indicate that the 90% retention rate for another user may be based at least in part on the below freezing temperature in the geographic region where the user is located. As another example, the retention analysis system 140 may indicate that the 20% retention rate for a user may be based at least in part on the below 25% win ratio. In yet another example, the retention analysis system 140 may indicate that the 25% retention rate for a user may be based at least in part on the skill level of the user's teammates and/or opponents in a match plan not satisfying a skill level threshold.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 1668, 166N, respectively (which may be referred to collectively as "penalties 166").

Example Prediction Model Generation Process

Figure 2:
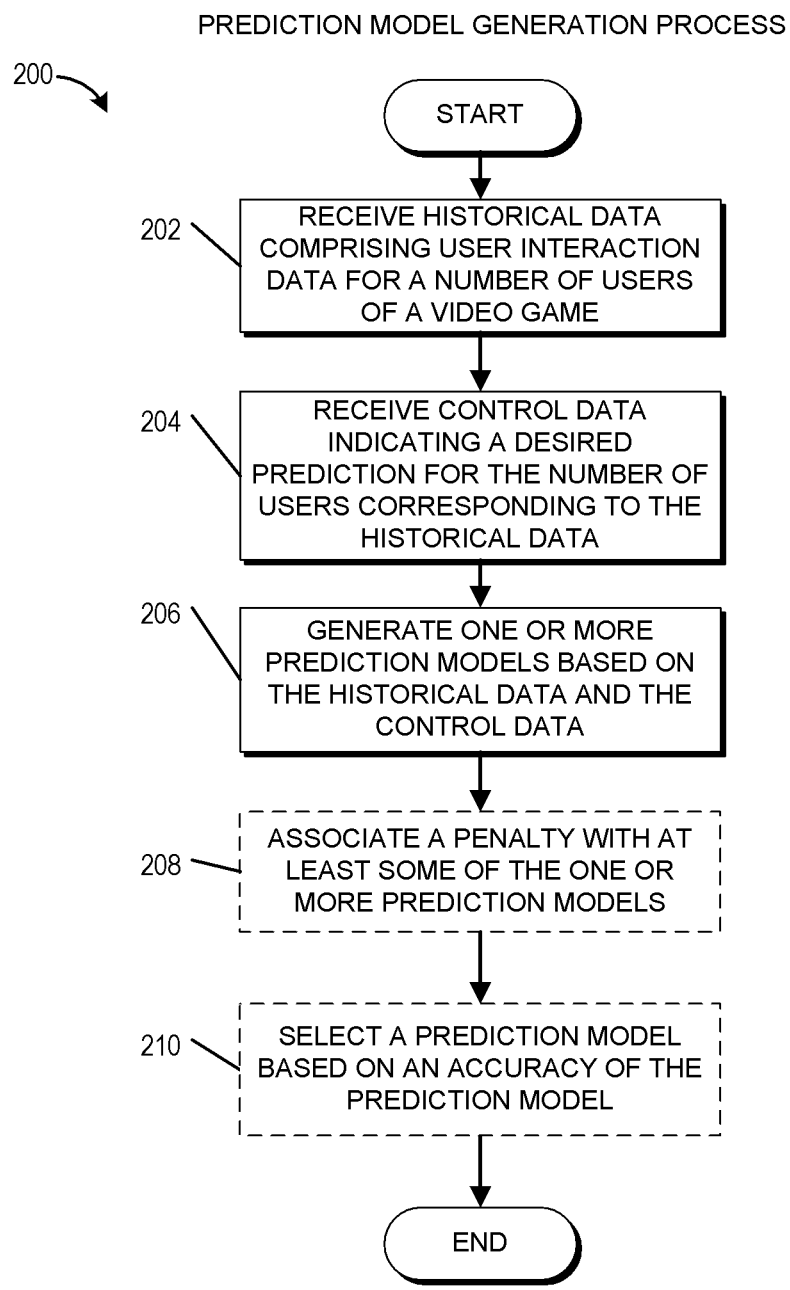
FIG. 2 presents a flowchart of an embodiment of a prediction model generation process.

FIG. 2 presents a flowchart of an embodiment of a prediction model generation process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a user matching system 132, a user clustering system 134, a skill evaluation system 136, a retention analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, or with the addition of a threshold number of new users available for analysis or playing a video game 112. However, the process 200 may be performed more or less frequently.

The process 200 begins at block 202 where the model generation system 146 receives historical data 152 comprising user interaction data for a number of users of the video game 112. This historical data 152 may serve as training data for the model generation system 146 and may include user demographics or characteristics, such as age, geographic location, gender, or socioeconomic class. Alternatively, or in addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. In addition, the historical data 152 may include data relating to one or more other users who played the video game 112 with a user from the number of users. In some cases, the historical data 152 may comprise user interaction data and other user or video game related data for multiple sets of users where each set includes a group of users that play a multiplayer instance of a video game together as opponents, teammates, or both. The user or video game data may include not only the above-mentioned data, but also skill information for each user with respect to the video game 112 and/or one or more actions that can be performed in the video game 112 and/or one or more elements (such as levels or obstacles) of the video game 112. In addition, the data may include in-game character selection preferences, role preferences, and other information that can be used to distinguish play styles, preferences, or skills of different users.

At block 204, the model generation system 146 receives control data 156 indicating a desired prediction criteria corresponding to the historical data 152. This control data 156 may indicate one or more features or characteristics for which the model generation system 146 is to determine a model. Alternatively, or in addition, the control data 156 may include a value for the features or characteristics that are associated with the received historical data 152. For example, the control data 156 may identify churn rate, or retention rate, as the desired feature to be predicted by the model that is to be generated by the model generation system 146. The churn rate or retention rate may correspond to a percentage of users associated with the historical data 152 that ceased playing the video game 112. Further, the control data 156 may identify a retention rate associated with the historical data. For example, the control data 156 may indicate that the retention rate is 60% for certain of the users whose data is included in the historical data 152. In some embodiments, the control data 156 may include multiple characteristics or features to be predicted by the model to be generated by the model generation system 146. For example, the control data 156 may identify, for the users whose data was provided as the historical data 152, both a retention rate and a reason for the retention rate (such as the skill level of the opponents diverging by more than a threshold skill delta, or a higher than threshold percentage of the teammates and/or opponents quitting an instance of the video game 112 before the match is completed), or a retention rate and an average monetary amount spent by the users whose data was provided as the historical data 152.

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

Optionally, at block 208, the model generation system 146 applies a penalty to or associates a penalty 166 with at least some of the one or more prediction models 160 generated at block 206. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the parameter function. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 146, at block 210, based at least in part on an accuracy of the prediction model 160 and any associated penalty selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty. In some such cases, a prediction model may be selected from a plurality of prediction models based on the accuracy of the output generated by the prediction model or may be selected at random.

Example Multiplayer Matching Process

Figure 3:
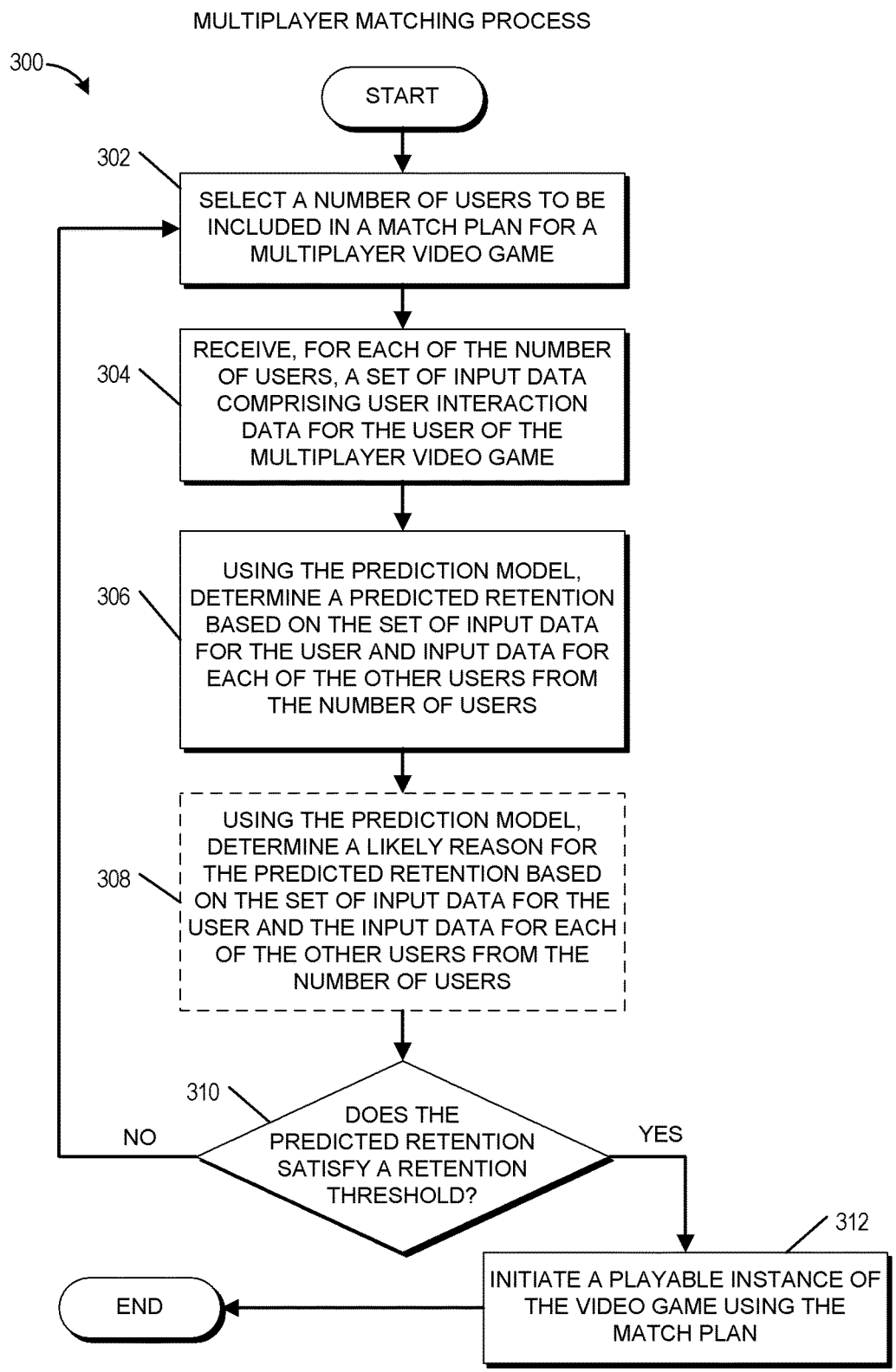
FIG. 3 presents a flowchart of an embodiment of a multiplayer matching process.

FIG. 3 presents a flowchart of an embodiment of a multiplayer matching process 300. The process 300 can be implemented by any system that can create a match plan of two or more users that may play the video game 112 as opponents, teammates, or a combination of the two. The process 300, in whole or in part, can be implemented by, for example, an interactive computing system 130, a user matching system 132, a user clustering system 134, a skill evaluation system 136, a retention analysis system 140, a model generation system 146, or a user computing system 110, among others. Although any number of systems, in whole or in part, can implement the process 300, to simplify discussion, the process 300 will be described with respect to particular systems. Further, it should be understood that the process 300 may be updated or performed repeatedly over time. For example, the process 300 may be repeated for each play session of a video game 112 or for each round of the video game 112. However, the process 300 may be performed more or less frequently.

The process 300 begins at block 302 where the user matching system 132 selects a number of users to be included in a match plan for a multiplayer video game 112. The user matching system 132 may use any type of system or process for identifying users to be grouped together as teammates, opponents, or combination of the two. For example, the user matching system 132 may identify the users based on a skill level and/or a position within a queue of players waiting to play the videogame. As another example, the user matching system 132 may select users at random within a certain time window. This time window may be related to the length of time that a set of users have been waiting in a queue of users. Moreover, the time window may vary based on the number of users in the queue of users. Further, in some cases, at least some of the number of users may be selected based on an indication that the at least some of the number of users have indicated a desire to play the video game 112 together.

At block 304, the retention analysis system 140 receives, for each of the number of users identified at block 302, a set of input data (such as the input data 172) comprising user interaction data for the user of the multiplayer video game 112. This input data 172 is typically, although not necessarily, user specific data. Further, the set of input data 172 may include both historical user interaction data and recent user interaction data for the user. Historical user interaction data may include user interaction data from a noncurrent play session and/or user interaction data that satisfies a threshold age or that is older than a particular threshold time period. For example, the historical user interaction data may include user interaction data that is at least a week or a month old. Alternatively, or in addition, the historical user interaction data may include data from play sessions that are more than 5 or 10 play sessions old.

Conversely, the recent user interaction data may include user interaction data that satisfies a threshold age or that is more recent than a particular threshold time period. For example, the recent user interaction data may include user interaction data that is less than a week or a month old. Alternatively, or in addition, the recent user interaction data may include data from play sessions that are less than 3, 5, or 10 play sessions old.

In some embodiments, the historical user data and the recent user data may be weighted differently within the prediction model 160. In some cases, each parameter 162 within the prediction model 160 may be repeated. For example, one version of the parameter may be based on the historical user data and may be associated with one weight 164 and another version of the parameter may be based on the recent user data and may be associated with a different weight 164. Moreover, in some implementations, the weight may be applied on a sliding scale or a graduated basis. For example, more recent historical user data may be associated with a higher weight 164 and less recent historical user data.

The user interaction data may include any data relating to the user's interaction with the video game 112 including, for example, an identity of an in game character selected by the user; a role that the user plays a threshold percentage of times (such as a healer or a defender); an amount of time the user has spent playing the video game; an amount of money the user has spent with respect to the video game 112; a skill level associated with the user; and the like. Further, block 304 may include receiving data relating to opponents or teammates that the user has previously played with. This additional data may include user interaction data for the opponents or teammates of the user has previously played with. In some cases, the user interaction data for a user may include opponent or teammate-dependent data. For example, the user interaction data for a user may indicate that the user typically (for example, more often than a threshold percentage) plays the video game 112 as a healer when the user's teammates are of a higher skill level than the user. However, user interaction data for the user may indicate that the user typically plays the video game 112 is a melee attack character when the user's teammates are of a lower skill level than the user.

In certain embodiments, particular values (such as default values) may be supplied to the parameter function for users that are not associated with user interaction data, or that are associated with user interaction data derived from less than a threshold number of matches or amount of playing with of the video game 112. Advantageously, in some such embodiments, the process 300 may be used with users that are new to playing the video game 112 or are associated with less than a threshold amount of matches or play time for the video game 112 by using the particular values for the user.

At block 306, the retention analysis system 140, using a parameter function or a prediction model 160, determines a predicted retention for each of the number of users based at least in part on the set of input data for the user and input data for each of the other users from the number of users. The prediction retention may be a probability that each of the users, or the group of users included in the match plan, continues to play the video game 112 for a particular period of time. Alternatively, or in addition, the prediction retention may be a "yes" or "no" value for each user, or the group of users included in the match plan, indicating whether the user will continue to play the video game 112 or cease playing the video game 112 with a particular threshold probability. In some cases, the set of input data for each user may vary and may include different types of data. For example, a preferred character class may be known for one user and included in the user interaction data, but may not be known for another user and may therefore be omitted from the user interaction data for the other user. Furthermore, in some cases, the particular match plan detailing which players are teammates and which players are opponents may be provided to the prediction model 160 to determine the retention for each of the number of users. In some such cases, the prediction model 160 may output, in addition to or instead of the retention, a match plan or an alternative match plan that maximizes the retention rate for the set of users. In some cases, the set of input data provided to the parameter function may identify two or more users that are to be grouped together as teammates or as opponents. For example, two players may indicate that they desire to play a match together while two other players may be selected at block 302 using a particular matchmaking procedure. Thus, in some cases, the match plan provided to the parameter function may indicate users that are to remain in the role identified in the match plan and may indicate other users that are not assigned fixed roles in the match plan.

Optionally, at block 308, the retention analysis system 140 uses the prediction model 160 to determine a likely reason for the predicted retention for each of the number of users based at least in part on the set of input data for the user and the input data for each of the other users from the number of users. For example, it may be determined during generation of the prediction model 160 that teams of users that include more than one healer are associated with a lower retention rate than teams of users that include one or less healers in the party of characters. Thus, in some such cases, the prediction model 160 may indicate that a low retention rate, or a rate below a particular threshold, may be due to a plurality of users who tend to select healer-based characters (or characters who are configured to be used as healers in the video game 112) included in the match plan for a particular team. In some cases, the retention rate may indicate a retention value for a particular match. In other cases, the retention rate may indicate long term or overall retention for playing the video game 112 over a period of time.

At decision block 310, the retention analysis system 140 determines whether the predicted retention for one or more of the users satisfies a retention threshold. If the predicted retention for one or more of the users does satisfy retention threshold, the application host system 138 initiates a playable instance of the videogame 112 using the match plan. If the predicted retention for at least one of the users does not satisfy the retention threshold, the process 300 may return to the block 302 where a new or different set or number of users may be selected. In some cases, a completely different set of users may be selected at block 302. In other cases, less than a completely different set of users may be selected at block 302. For example, in some cases, only users with a below threshold retention level may be replaced by other users. In other cases, the users selected for replacement may be based on one or more additional factors, such as the length of time the users have been in the queue waiting to play the videogame 112. In some embodiments, a threshold number of users may be required to not satisfy the retention threshold before a new number of users is selected. For instance, in one use case, if eight or more users out of ten users included in a match plan are associated with a retention that satisfies a retention threshold, the process 300 may proceed to block 312. Thus, in this non-limiting example use case, a single user associated with a retention that does not satisfy a retention threshold may not prevent the match plan from being used to initiate the playable instance of the video game at block 312.

In some embodiments, a separate retention threshold may be associated with the match plan and with each of the users included in the match plan. The two retention thresholds may be the same or may differ. In some cases, both retention thresholds should be satisfied before the match plan is selected for playing an instance of the video game. In other cases, it may be sufficient for either the match plan and/or each user from the set of users to satisfy a retention threshold. In one example, an aggregation of retention values for each user may be used to create a match plan retention value. In some cases, the aggregated retention value is compared against a match plan retention threshold as part of decision block 310. Further, if the match plan retention threshold is satisfied, but a threshold number of users included in the match plan are associated with retention rates that do not satisfy a retention threshold, the match plan may not be selected for playing the instance of the video game. In some implementations, each user may satisfy the retention threshold, but the match plan may not satisfy the retention threshold resulting in the match plan not being selected.

In certain embodiments, the prediction model 160 may account for users who indicate a desire to play an instance of the video game 112 together. For example, the parameters of the prediction model 160 associated with the relationship between a first user and a second user who indicate a desire to play together may be weighted differently than for users who have made no indication that they desire to play together. Advantageously, in certain embodiments, by modifying the weights of parameters associated with the interaction of users who indicate a desire to play together, the retention rate may account for users that may not be desirable in a match plan, but who indicate a desire to play together. For example, two siblings may have different play styles or skill levels that result in the prediction model 160 outputting a low retention rate. However, the retention analysis system 140 can modify the weighting of parameters of the parameter function to account for the siblings' indication that they desire to play together.

In some cases, the number of users selected at block 302 is equal to the number of users that are to play the instance of the video game 112. In other cases, the number of users that are selected at block 302 is greater than the number of users that are to play the instance of the video game 112. In some such cases, the users included in the match plan with the highest retention are selected. In some other such cases, one or more additional selection criteria may be used to select the match plan. For example, a match plan that satisfies the retention threshold and that includes one or more users that have been waiting in a queue of users to play the video game 112 for more than a threshold period of time may be selected.

In some cases, one or more of the above embodiments may be combined with clustering to facilitate determining a match plan for a set of users in a multiplayer video game. Some example embodiments of clustering the may be used with the present disclosure are described in more detail below.

Example Clustering Embodiments

In some embodiments, a clustering process may be used to group users who share one or more characteristics that may be used to identify multiplayer matchmaking preferences for a video game 112. Clusters may include one or more users that share one or more characteristics. Matchmaking preferences can be associated with each cluster to facilitate identifying one or more opponents or teammates for users associated with the cluster. A user whose characteristics match a particular cluster, may be assigned to the particular cluster. An opponent of teammate may be selected for a user based on the matchmaking preferences associated with the cluster. Certain non-limiting example processes are described below that enable multiplayer matchmaking using clustering.

Example Cluster Creation Process

Figure 4:
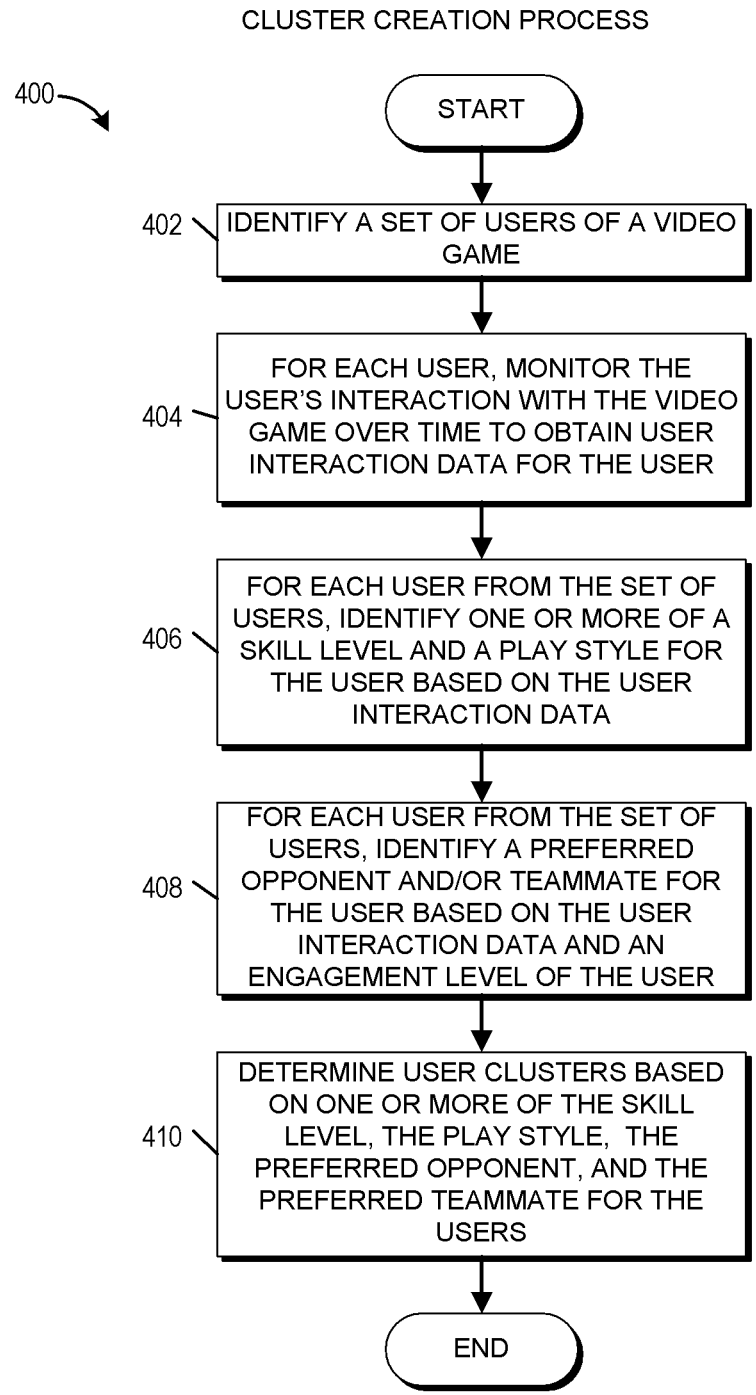
FIG. 4 presents a flowchart of an embodiment of a cluster creation process.

FIG. 4 presents a flowchart of an embodiment of a cluster creation process 400. The process 400 can be implemented by any system that can create a plurality of clusters or groups of users based on each user's interaction with a video game and the level of engagement associated with each user. For example, the process 400, in whole or in part, can be implemented by an interactive computing system 130, a user matching system 132, a user clustering system 134, a skill evaluation system 136, or a user computing system 110, among others. Although any number of systems, in whole or in part, can implement the process 400, to simplify discussion, the process 400 will be described with respect to particular systems.

Further, it should be understood that the process 400 may be updated or performed repeatedly over time. For example, the process 400 may be repeated once per month, with the addition or release of a new video game, or with the addition of a threshold number of new users available for analysis or playing a video game 112. However, the process 400 may be performed more or less frequently. In addition, the process 400 may be repeated to identify one or more user clusters based on users' abilities or play characteristics, and to identify one or more user clusters based on users' desired play characteristics for opponents and/or teammates. In some cases, a user may be associated with different user clusters based on a selection by the user. For example, a user may be associated with one user cluster when selecting a melee-focused character (such as a character who uses a sword to fight) and may be associated with another user cluster when selecting a range-focused character (such as a character that uses a crossbow to fight).

The process 400 begins at block 402 where the user clustering system 134 identifies a set of users of the video game 112. To simplify discussion, the process 400 is primarily described with respect to a single video game, such as the video game 112. However, this disclosure is not limited as such, and the process 400 can be implemented for a plurality of video games. In some cases, each of the plurality of video games may be of the same genre or may share one or more characteristics in common. In other cases, the plurality of video games may be distributed across a number of genres. The genres may be based on theme and/or game type (for example, an open world game, a role-playing game, a first person shooter, a side scrolling game, a simulation, a space fighter, a western, and the like). Further, in some cases, the process 400 includes analyzing data across additional video games to confirm or refine the clusters created based on the analysis of a video game 112.

At block 404, for each user identified at the block 402, the user clustering system 134 monitors the user's interaction with the video game 112 over time to obtain user interaction data for the user. This monitoring can be done by reviewing sets of user interaction data for the user from different time periods or by pulling data from the video game 112 in real time and storing the data for later review. This user interaction data can include any of the information previously described with respect to FIG. 1. Further, the user interaction data may include data relating to the users progress within the video game; the action taken by the user when the user succeeds in completing a level or objective; the action taken by the user when the user does not succeed in completing a level or objective; differences in actions taken by the user based on the length of time it takes the user to succeed at an objective; the length of time the user plays the video game each time or on average when the user plays the video game; whether the user typically plays the game for short periods of time or long periods of time; whether the user spends real world currency (as opposed to in-game currency) when playing the video game, which may be used as a factor to identify the users level of engagement (for example, a user spends money while playing a video game is more likely to play the game again compared to a user who does not spend money or playing a video game); and any other criteria that can be used to measure the users level of engagement with the video game when playing with and/or against other users. Further, user interaction data may also include information relating to the type of user computing system 110 used by the user to access the video game; differences, if any, and how the user interacts with the video game based on the type of user computing system 110 used to access the video game; whether the user uses multiple user computing systems 110 to access the video game; and the like. Moreover, as previously mentioned, the user clustering system 134 may categorize or otherwise delineate the user interaction data based on characteristics of opponents or teammates of the user.

In some cases, the user clustering system 134 filters out users whose user interaction data does not satisfy a minimum set of interaction criteria. This minimum set of interaction criteria may be related to the length of time that the user played the game or to whether the user played the video game for multiple play sessions. For example, a user who played the video game less than a threshold amount of time or for less than a threshold number of play sessions may not have provided sufficient data to determine play characteristics of the user and/or preferences of play characteristics for teammates and/or opponents. Further, the minimum set of interaction criteria may be related to the type of actions the user has taken in the video game 112, the type of the video game 112, and the progress the user has made in the video game 112. In some cases, users whose user interaction data does not satisfy the minimum set of interaction criteria may be retained, but weighted lower compared to user interaction data for users that does satisfy the minimum set of interaction criteria.

For each user from the set of users, the skill evaluation system 136 identifies one or more of a skill level and a play style for the user based at least in part on the user interaction data for that user at block 406. Determining the skill level and the play style for the user may include determining a success rate for the user when playing the video game 112 and/or the types of in-game actions taken by the user when playing the video game 112.

At block 408, for each user from the set of users, the user clustering system 134 identifies a preferred opponent and/or teammate for the user based at least in part on the user interaction data and an engagement level of the user. The user interaction data may include data indicating whether the user completed a match or a portion of the video game 112 with opponents and/or teammates associated with particular play characteristics. Further, the user interaction data may include data indicating whether the user played additional matches or portions of the video game 112 with particular opponents and/or teammates associated with the particular play characteristics. Moreover, the block 408 may include determining play characteristics for the opponents and/or teammates of the user.

Further, determining the level of engagement for the user may include determining whether and/or how much money the user spends while playing the video game. In some cases, determining the level of engagement for the user may include determining a probability that the user will play the video game again based on the user interaction data collected for the user. In some cases, determining the level of engagement for the user may include determining the user's skill with respect to the video game. Further, performing the operations associated with one or more of the blocks 406 and 408 may include applying one or more machine learning algorithms using the user interaction data as input to determine a probability that the user continues to play or stops playing the video game based on the opponents and/or teammates that play the video game 112 with the user. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of user interaction data may be analyzed to identify user preferences. These user preferences may be determined off-line using historical data. Further, the determined preferences may then be used in real-time to select a match plan (as described in more detail below) that may provide increased user enjoyment and consequently engagement compared to other matchmaking systems that do not use the techniques disclosed herein.

At block 410, the user clustering system 134 determines a number of user clusters based on one or more of the skill level, the play stile, the preferred opponent, and/or the preferred teammate for the users. Determining the user clusters may include grouping users based on their behavior as determined from the user interaction data monitored at the block 404. Further, grouping the users into the user clusters may include identifying characteristics associated with each user based on the user interaction data collected for the users that indicate a level of engagement with the video game. For example, suppose that the system determines that a number of users typically play the video game 112 for five or more matches when defensive-minded teammates are selected. Further, suppose that these users typically stop playing the video game after a single match when paired with offensive-minded teammates. This number of users may be clustered together in a user cluster for users who prefer to play with teammates who are more interested in playing the video game 112 using a defensive play style. In contrast, another group of players who tend to play the video game 112 for more play sessions when paired with more offensive-minded teammates may be clustered together in a separate user cluster. As another example, users who tend to quit the video game 112, or a particular match, when matched with a user using the same character type, but who tend to complete the match when matched with a user using a difference character type may be clustered separately from users who user interaction data does not indicate an opponent preference. One or more machine learning algorithms may be used to identify the clusters of users based at least in part on the user interaction data for the set of users.

In some cases, block 410 may include generating subclusters within each cluster. For example, one cluster may include users who tend to prefer playing with a teammate that uses a tank-based style, which may include a teammate whose in-game character may take a lot of damage before being defeated. Within this cluster, there may be two subclusters. One subcluster may be for users who tend to prefer playing with a teammate who uses the tank-based style regardless of the user's selected character. Another subcluster may be for users who tend to prefer the teammate who uses the tank-based style when the user selects a magic-based character with low health, but prefers a different type of teammate when the user selects the tank-style character.

Example Cluster Assignment Process

Figure 5:
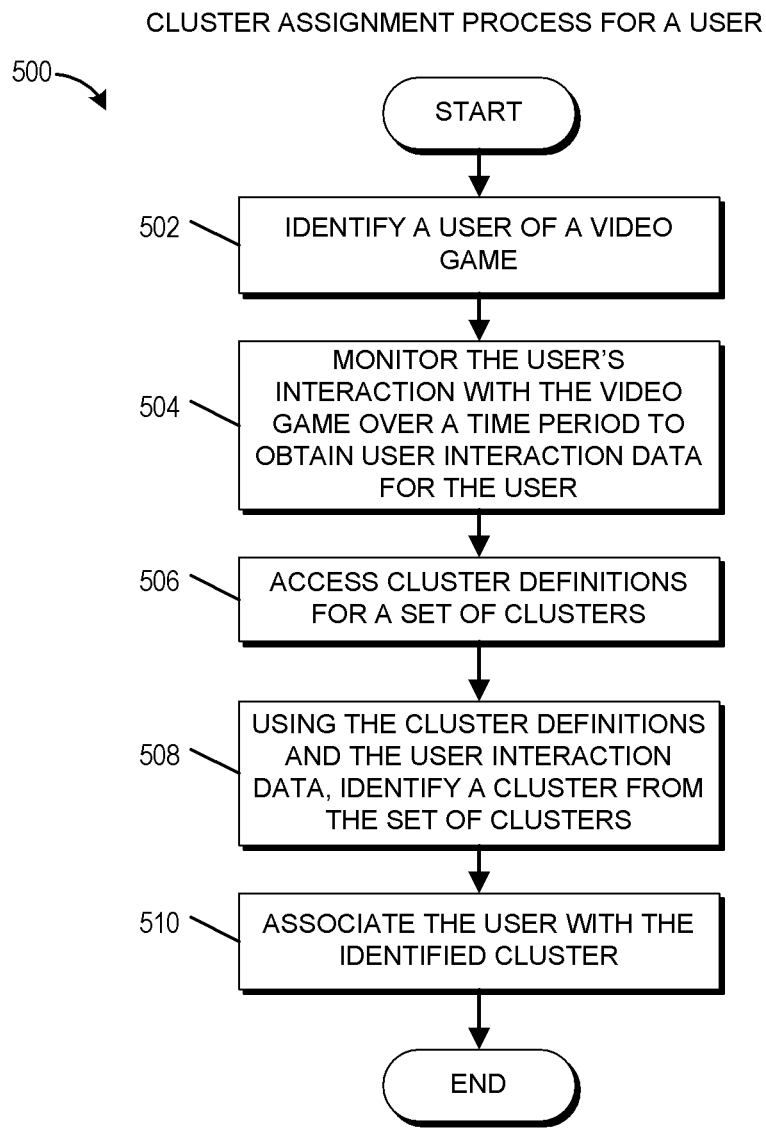
FIG. 5 presents a flowchart of an embodiment of a cluster assignment process for a user.

FIG. 5 presents a flowchart of an embodiment of a cluster assignment process 500 for a user. The process 500 can be implemented by any system that can identify a user cluster with which to associate a user based on the user's interaction with a video game. For example, the process 500, in whole or in part, can be implemented by an interactive computing system 130, a user matching system 132, a user clustering system 134, a skill evaluation system 136, or a user computing system 110, among others. Although any number of systems, in whole or in part, can implement the process 500, to simplify discussion, the process 500 will be described with respect to particular systems. Further, it should be understood that the process 500 may be updated or performed repeatedly over time. For example, the process 500 may be repeated once per month, after a threshold number of play sessions by the user since a prior performance of the process 500, or after the user plays a new video game. However, the process 500 may be performed more or less frequently.

The process 500 begins at block 502 where the user clustering system 134 identifies a user of the video game 112. The user may be identified based on user account information, such as a user login, or based on information associated with an avatar of the user, such as a screen name. Alternatively, or in addition, a user may be identified based on information associated with a user computing system 110 of the user, such as an Internet protocol (IP) address.

At block 504, the user clustering system 134 monitors the user's interaction with the video game 112 over a time period to obtain user interaction data for the user. This monitoring can be done by reviewing sets of user interaction data for the user from different time periods or by pulling data from the video game 112 in real time and storing the data for later review. Typically, the time period is a historical time period that may include the user's interaction with the video game 112 over multiple play sessions. Further, the length of the time period may be selected to satisfy or exceed a minimum time threshold. For example, the time period may be selected to be at least, or to exceed, one month, two months, half a year, and the like. In some cases, instead of or in addition to monitoring the user's interaction with the video game over a time period, the user clustering system 134 may be configured to monitor the user's interaction over a threshold number of play sessions. For example, the user clustering system 134 may be configured to monitor the first number (for example, five, ten, twelve, and the like) of play sessions of the user or the most recent number of play sessions of the user. In some cases, the block 504 may include monitoring the user's interaction with a plurality of video games. The plurality of video games may be video games of the same type as the video game 112. In other cases plurality of video games may not be limited to a particular type of video game. In some embodiments, the time period may be or may include a time during which the user plays a training portion or an interactive tutorial included with the video game 112.

The user clustering system 134 accesses cluster definitions for a set of clusters at block 506. Accessing the cluster definitions for the set of clusters may include accessing a user data repository 142. The cluster definitions may include a set of characteristics that correlate to or are derived from user interaction data for a set of users. Further, this set of characteristics may identify the types of opponents and/or teammates that users associated with the user cluster prefer. In addition, the set of characteristics may identify or include characteristics of the users who are associated with the user cluster.

Using the cluster definitions accessed at the block 506 and the user interaction data obtained at the block 504, the user clustering system 134 identifies a cluster from the set of clusters at the block 508. Identifying the cluster from the set of clusters may include matching characteristics of the user interaction data with characteristics associated with each of the set of clusters. For example, if the user interaction data indicates that the user prefers to stay behind and guard the flag in a capture the flag style shooting game, the user clustering system 134 may identify a user cluster associated with users who prefer teammates that tend to spend more time attempting to capture the flag in the capture the flag style shooting game. As another example, if the user interaction data indicates that the user has a relatively low level of skill playing a particular video game compared to other users who play the video game and that the user tends to quit a match when the opponent has a higher level of skill that the user, then the user clustering system 134 may identify a user cluster that is associated with users of low skill who like to play against other users of low skill compared to other users of the video game.

In some cases, the determination of the cluster from the set of clusters may include identifying the user's actions or reactions to events within the video game including how the user responds to obstacles within the game. In addition, the determination of the cluster from the set of clusters may include identifying the user's actions or reactions to other users within the game. These actions or reactions may include a determination of whether or how frequently the user prematurely quits a game or match when playing with or against users associated with particular characteristics. Further, the actions or reactions may relate to the user's play style or changes in play style when playing with or against users associated with particular characteristics.

By analyzing the user's action or reactions obtained from the user interaction data, the user's level of engagement can be determined and various related engagement characteristics. These engagement characteristics can relate to the types of opponents and teammates that the user prefers to play the video game 112 with. Further, these engagement characteristics and/or other characteristics related to the user that are derived from the user's interaction with the video game may be compared to characteristics associated with the set of clusters to identify a corresponding cluster to associate with the user. Some non-limiting examples of the engagement characteristics may include: user skill level; desired skill level of opponents; desired skill level of teammates; character selection preferences of the user; desired character selection of opponents; desired character selection of teammates; play style of user; desired play style of opponents; and desired play style of teammates.

In some embodiments, the engagement characteristics may be presented to the user and, in response, the user clustering system 134 may receive input from the user regarding the engagement characteristics. For example, the user may indicate whether the user agrees with the analysis. As another example, the user may indicate that he or she was experimenting with a new play style that the user does or does not plan to continue using. In yet another example, the user can indicate that he or she does not agree with the desired opponent or teammate characteristics because, for example, the user was playing with non-preferred opponents or teammates for personal reasons (for example, the non-preferred opponents or teammates were friends or relatives). The user clustering system 134 may use the user input to adjust or confirm its selection of a particular user cluster. In some cases, the user input may be weighted based on the amount of data the user clustering system 134 has obtained at block 504. For example, the user input may be weighted more heavily for users with a little history (such as two or three play sessions) and weighted less heavily for users with a significant amount of history (such as fifty or a hundred play sessions).

In some cases, the interactive computing system 130 may cause sliders, or some other user interface element, to be displayed to the user to indicate the user's engagement characteristics on a spectrum. For instance, the slider may indicate the percentage of time that the user tends to prefer to play a defensive game plan or to use range weapons. Although the analysis of the user interaction data may be presented to the user, the user may or may not be informed that the information is being used to adjust the matching of teammates or opponents with the user.

After the user has played a match or portion of the video game 112, the user clustering system 134 may question the user to help determine user preferences or to obtain information regarding how the user viewed the selection of teammates or opponents. Generally, although not necessarily, the questions presented to the user relate to the enjoyment and/or engagement level of the video game when playing with users who have one or more identified characteristics that are shared with the teammates or opponents of the completed match or portion of the video game. In other words, generally, although not necessarily, the questions presented are designed to avoid personal attacks of other users. The user may be questioned after the user indicates that the user is ending a play session. Thus, the user can be questioned regarding his or her experience without interrupting the user's play experience. Further, the user clustering system 134 may parse chat message data of the user to determine the user's engagement level and/or the user's view of a teammate or opponent, including the play style or character selection of the teammate or opponent. In some cases, parsing the chat message data may also be used to determine whether one user should be blacklisted from being matched up in a session of the video game 112 with another user.

At block 510, the user clustering system 134 associates the user with the identified cluster. Associating the user with the identified cluster may include storing an association between the user and the identified cluster at the user data repository 142.

In some embodiments, the process 500 may be used to determine how likely a user is to stop playing the video game 112. This determination can sometimes be referred to as a "churn rate" or "churn" and can be associated with how often a user switches video games or stops playing certain video games. For instance, a user who tends to play video games for one or two play sessions and then move on to another video game may have a high churn rate. By identifying such users, it may be possible to modify the selection of teammates or opponents for the user when generating matchups or a match plan to reduce the rate of churn for certain users. For example, if it is determined that matching a user with teammates who are more defensive minded in their playstyle (for example, the teammates tend to move very slowly across the game map compared to the user) results in the user ceasing to play the video game 112 or quitting matches at a higher rate compared to other match plans, the user may be associated with a cluster of users who prefer to play with faster players or more offensive-minded players.

In some cases, a user may be associated with one user cluster that identifies both opponent and teammate preferences. Alternatively, the user may be associated with multiple user clusters that identify both opponent and teammate preferences. In yet other embodiments, the user may be associated with one or more user clusters that identify opponent preferences and one or more separate user clusters that identify teammate preferences. In some such cases, the process 500 may be performed one or more times to determine one or more user clusters to associate with a user that identify opponent preferences and the process 500 may be performed one or more additional times to determine one or more user clusters to associate with the user that identify teammate preferences. Further, in some embodiments, the process 500 may be performed to identify one or more user clusters with which to associate the user based on skill level, play style, user location, features of the user's user computing system 110, and other characteristics associated with the user's play of the video game 112. This user cluster association may be used to facilitate identifying whether to match the user with other users during a match plan based on other user's preferences. Thus, a user may be associated with one or more user clusters based on the user preferences and one or more additional user clusters based on user characteristics to facilitate creating a match plan that satisfies both the user's preferences and the preferences of other users included in the match plan.

Example Opponent Matchmaking Process

Figure 6:
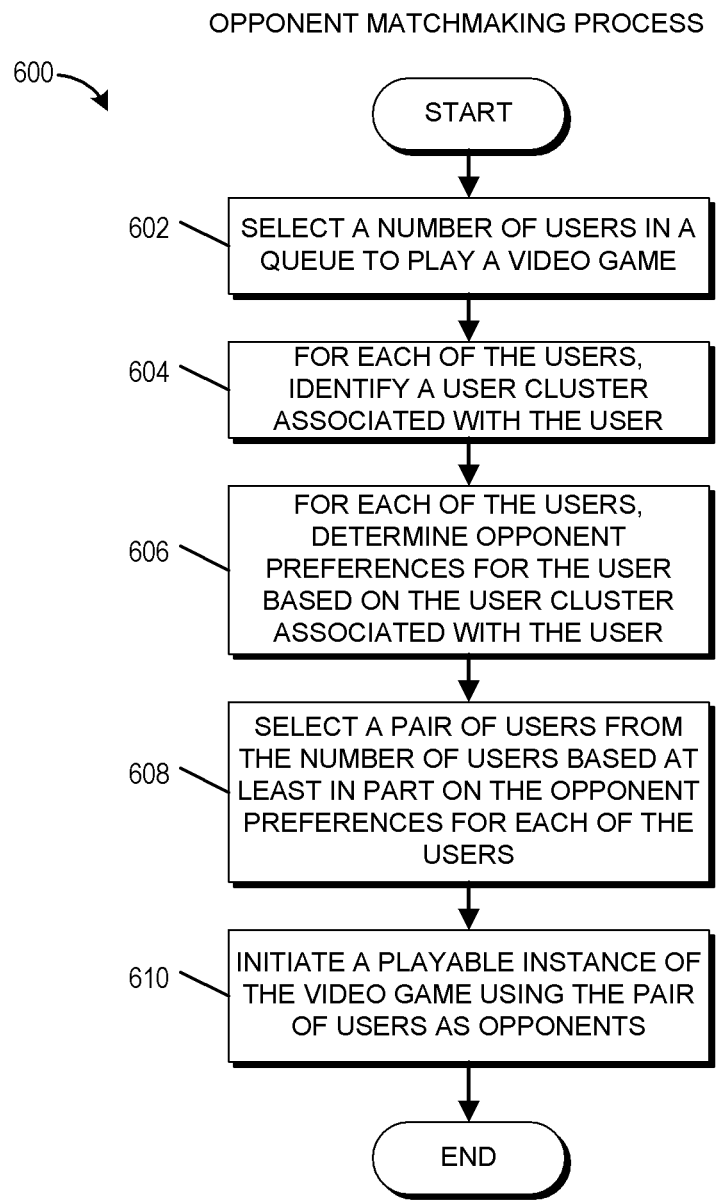
FIG. 6 presents a flowchart of an embodiment of an opponent matchmaking process.

FIG. 6 presents a flowchart of an embodiment of an opponent matchmaking process 600. The process 600 can be implemented by any system that can match a user with an opponent for playing a video game. For example, the process 600, in whole or in part, can be implemented by an interactive computing system 130, a user matching system 132, a user clustering system 134, a skill evaluation system 136, or a user computing system 110, among others. Although any number of systems, in whole or in part, can implement the process 600, to simplify discussion, the process 600 will be described with respect to particular systems. Further, the process 600 may be performed one or more times to identify one or more opponents to match with a user and/or a user and his or her teammates.

The process 600 begins at block 602 where the user matching system 132 selects a number of users in a queue to play a video game 112. The user matching system 132 may select a first quantity or threshold number of users beginning from the first position in the queue up to a threshold position within the queue. For example, the user matching system 132 may select the first 10, 20, or 50 users in the queue. Alternatively, the user matching system 132 may select a threshold number of users from the queue that may or may not include the first threshold number of users. For example, if the user matching system 132 is to select 50 users, the selected users may or may not be the first 50 users and the queue, but may include a selection of 50 users from, for example, the first 100 users in the queue. The selection of the users from the queue may be based at least in part on one or more of the following: the amount of time that a user has been waiting in the queue; the inclusion of the user in a black list; a request by the user to play with or against another particular user; the geographic and/or network location of the user; or network characteristics associated with the user (for example, a speed or packet drop rate of the user's local network).

For each of the users selected at the block 602, the user clustering system 134 identifies a user cluster associated with the user at block 604. Identifying a user cluster associated with the user may include accessing a set of user clusters from the user data repository 142. The user cluster associated with the user may be identified based at least in part on a user account name, a user avatar name, the user IP address, or any other identifying information of the user that may be used to identify the user cluster associated with the user. In some cases, the block 604 may include identifying multiple user clusters for each user. For instance, a user cluster may be identified relating to opponent preferences of the user and another user cluster may be identified relating to user characteristics of the user, such as the user's skill level or play style.

At block 606, for each of the users identified at the block 602, the user matching system 132 determines opponent preferences for the user based at least in part on the user cluster associated with the user. In some embodiments, the identification of the user cluster at block 604 and/or the determination of opponent preferences at block 606 may be based at least in part on a selection of a playable character in the video game 112 by the user. For example, a user may be associated with one user cluster that indicates a particular opponent preference when the user selects a character with a range weapon and the user may be associated with another user cluster that indicates a different opponent preference when the user selects a character with a melee weapon.

The user matching system 132, at block 608, selects a pair of users from the number of users selected at block 602 based at least in part on the opponent preferences for each of the users is determined at block 606. In some cases, the block 608 may include selecting more than a pair of users. For example, in a video game that matches players in a 2×2, 3×3, 1×1×1, 5×5×5, or 2×2×2×2 configuration, more than a pair of users may be selected at block 608.

Further, selecting a pair of users based at least in part on the opponent preferences may include generating an engagement score for the pair of users based at least in part on the characteristics of each user that matches or satisfies the other user's opponent preferences as determined based at least in part on the user clusters associated with each of the users. This engagement score may be calculated as a combination of a separate engagement score associated with each user. For instance, an engagement score of seven may be calculated for a user if seven out of ten preferences are satisfied by the selected opponent. Further, in engagement score of eight may be calculated for the opponent if eight out of ten preferences of the opponent are satisfied by the user. The engagement score for that match or the pair of users may be calculated by averaging the two engagement scores to obtain an engagement score of 7.5.

In some cases, the pair of users is selected to play a match if the engagement score satisfies a threshold engagement score. For example, if the threshold engagement score is seven, the pair of users from the previous example may be selected to play match. However, the threshold engagement score is eight a pair of users from the previous example may not be selected to play the match. The threshold engagement score may vary based on the number of users in the queue waiting to play the video game and/or based on how long one or more of the users in the selected pair of users has been in the queue. In cases where teams of users are being matched against each other's opponents, the engagement score of each user within the team may be aggregated together to determine whether the threshold engagement score is satisfied.

Calculating the engagement score for the opponent pair may include weighting one or more of the characteristics that match or do not match opponent preferences for one of the users. For example, if a user cluster indicates that a user values a skilled opponent higher than in opponent who selects a particular character, the skill level of the opponent may be weighted higher than the character selection of the opponent in determining whether the pair of users satisfies the engagement score threshold.

At block 610, the user matching system 132 initiates a playable instance of the video game 112 using the pair of users selected at block 608 is opponents. In some cases, a portion of the video game 112 may already be executing for each of the selected users. For example, the portion of the video game 112 that enables the users to select a playable character in to request a matchup with another user is an opponent to be executing before the process 600 is performed. Thus, the block 610 may include initiating another portion of the video game 112 or a matchup between the users rather than initiating execution of the video game 112 in its entirety. However, in certain embodiments, the block 610 may include initiating the video game 112 in its entirety. For example, in cases where a separate application performs the process 600, the block 610 may include initiating the video game 112 with the selected pair of users.

In some embodiments, the process 600 selects a single pair of users to play as opponents in the video game 112. The process 600 may then be repeated to select another pair of users to play is opponents in another instance of the video game 112. However, in some cases, a single performance of the process 600 may result in a plurality of pairs of users being selected and a plurality of instances of the video game 112 being initiated based on the plurality of pairs of users selected. For example, if performing the operations with respect to the block 608 results in 20 pairs of users being selected that each satisfy the engagement score threshold, 20 playable instances of the video game 112 may be initiated at block 610.

Example Teammate Selection Process

Figure 7:
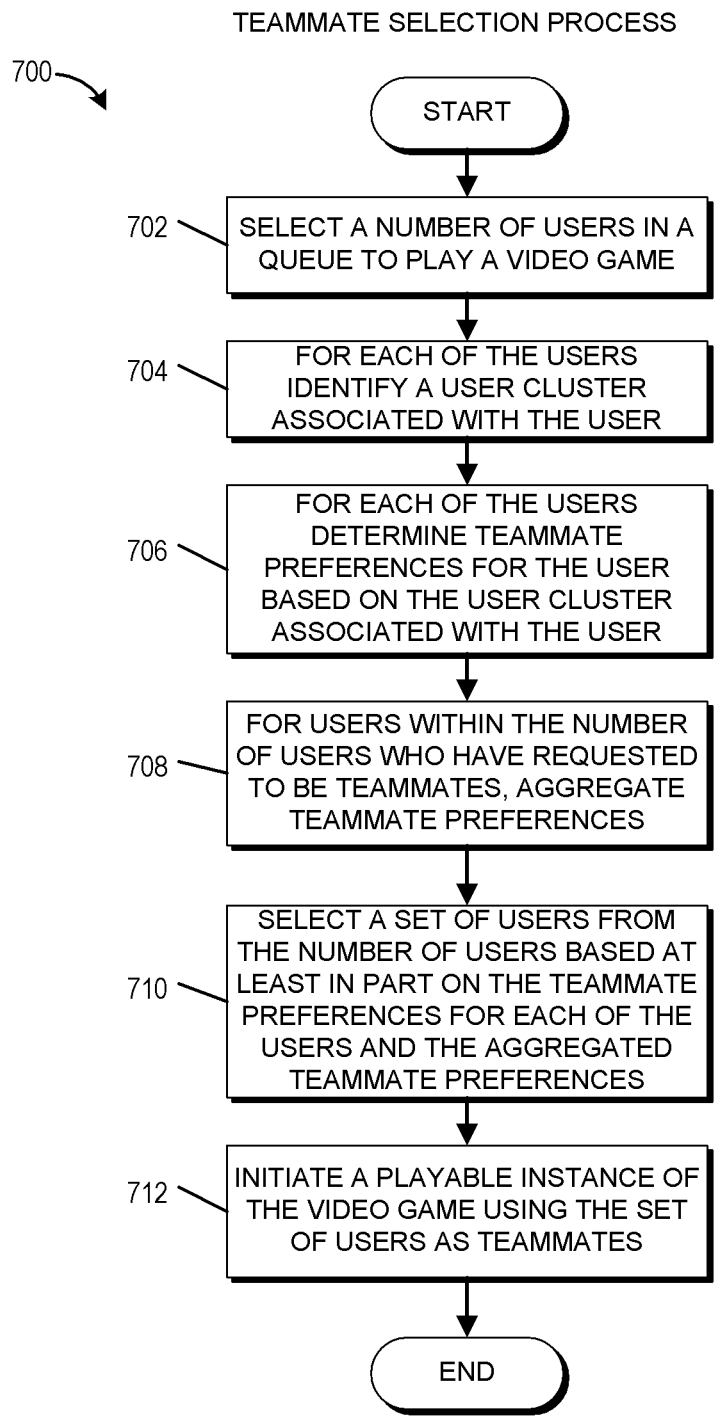
FIG. 7 presents a flowchart of an embodiment of a teammate selection process.

FIG. 7 presents a flowchart of an embodiment of a teammate selection process. The process 700 can be implemented by any system that can match a user with a teammate for playing a video game. For example, the process 700, in whole or in part, can be implemented by an interactive computing system 130, a user matching system 132, a user clustering system 134, a skill evaluation system 136, or a user computing system 110, among others. Although any number of systems, in whole or in part, can implement the process 700, to simplify discussion, the process 700 will be described with respect to particular systems. Further, the process 700 may be performed one or more times to identify one or more teammates to match with a user.

The process 700 begins at block 702 where the user matching system 132 selects a number of users in a queue to play a video game 112. In some embodiments, the block 702 may include one or more of the embodiments described above with respect to the block 602. In some cases, at least some of the users selected may be selected out of order because, for example, a pair of users requested to be placed on the same team.

For each of the users selected at the block 702, the user clustering system 134 identifies a user cluster associated with the user at block 704. In some embodiments, the block 704 may include one or more of the embodiments described above with respect to the block 604. Further, as previously described, the user cluster identified at the block 704 may be the same user cluster or a different user cluster is identified when determining opponent preferences for a user.

At block 706, for each of the users identified at the block 702, the user matching system 132 determines teammate preferences for the user based at least in part on the user cluster associated with the user. In some embodiments, the block 706 may include one or more of the embodiments described above with respect to the block 606. At block 708, for users within the number of users who have requested to be teammates, the user matching system 132 may aggregate teammate preferences identified at block 706 to obtain aggregated teammate preferences. Similarly, characteristics of the users who have requested to be teammates may be aggregated. In selecting additional teammates or opponents, the users who have requested to be teammates may be glued together or treated as a single user for the purposes of determining additional teammates and/or opponents that are likely to provide a higher degree of engagement compared to other combinations of teammates and/or opponents. In some embodiments, the block 708 may be optional or omitted. For example, in cases where there are no users who have requested to play together, the block 708 may be optional or omitted.

At block 710, the user matching system 132 selects a set of users from the number of users based at least in part on the teammate preferences for each of users and/or the aggregated teammate preferences, if any. In some embodiments, the block 710 may include one or more of the embodiments described with respect to block 608.

At block 712, the user matching system 132 initiates a playable instance of the video game 112 using the set of users selected at block 710 as teammates. In some embodiments, the block 712 may include selecting one or more computer-controlled opponents based at least in part on the set of users selected as teammates. Further, in some embodiments, the block 712 may include one or more of the embodiments described with respect to block 610.

Example Combined Teammate And Opponent Selection

Figure 8:
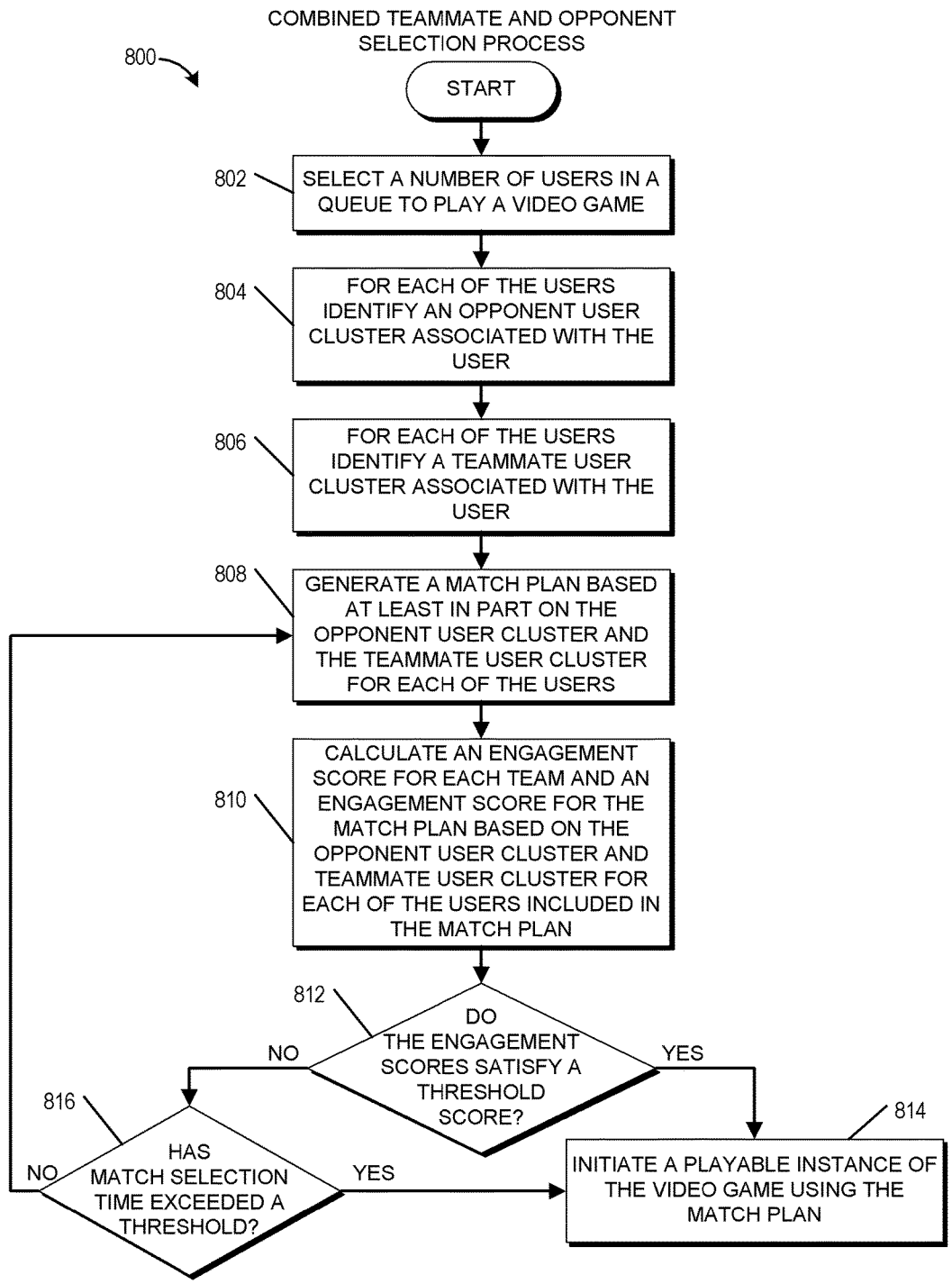
FIG. 8 presents a flowchart of an embodiment of a combined teammate and opponent selection process.

FIG. 8 presents a flowchart of an embodiment of a combined teammate and opponent selection process 800. The process 800 can be implemented by any system that can match a user with one or more teammates and one or more opponents for playing a video game. For example, the process 800, in whole or in part, can be implemented by an interactive computing system 130, a user matching system 132, a user clustering system 134, a skill evaluation system 136, or a user computing system 110, among others. Although any number of systems, in whole or in part, can implement the process 800, to simplify discussion, the process 800 will be described with respect to particular systems.

The process 800 begins at block 802 where the user matching system 132 selects a number of users in a queue to play a video game 112. In some embodiments, the block 802 may include one or more of the embodiments described above with respect to the block 602. In some cases, at least some of the users selected may be selected out of order because, for example, a pair of users requested to be placed on the same team or to be matched as opponents.

For each of the users selected at the block 802, the user clustering system 134 identifies an opponent user cluster associated with the user at block 804. For each of the users selected at the block 802, the user clustering system 134 identifies a teammate user cluster associated with the user at block 806. In some cases, the opponent user cluster selected for a user at block 804 and the teammate user cluster selected for the user at block 806 are the same user cluster. In other embodiments, the user clusters are different. Further, in certain embodiments, the blocks 804 and 806 may include one or more of the embodiments described above with respect to block 604.

At block 808, the user matching system 132 generates a match plan based at least in part on the opponent user cluster and the teammate user cluster for each of the users. Generating the match plan may include selecting a plurality of sets of one or more users to play an instance of the video game 112 or a round or match within the instance of the video game 112. Thus, for example, the match plan may include two groups of two players per group, or three groups of four players per group, or any other combination of groups and players per groups including combinations with unbalanced numbers of players per group.

Further, generating the match plan may include accounting for user selections of opponents and/or teammates. For example, suppose a video game 112 matches two groups of four players against each other. If two users indicate that they desire to play on the same team ("team 1") against one other user on the opposite team ("team 2"), the user matching system 132 may select two other users to be on team 1 with the two users and three other users to be on team 2 with the one other user.

At block 810, the user matching system 132 calculates an engagement score for each team and an engagement score for the match plan based on the opponent user cluster and the teammate user cluster for each of the users included in the match plan. Calculating the engagement score for each team may include determining for each user on a team whether the teammates for the user are associated with characteristics that the user desires in his or her teammates based on the teammate user cluster associated with the user. Further, calculating the engagement score for each team may include determining for each user on a team whether the users on the opponent team are associated with characteristics that the user desires in his or her opponents based on the opponent user cluster associated with the user.

In some embodiments, instead of calculating the engagement scores on a user-by-user basis, the engagement scores for the teammates and/or opponents may be calculated in the aggregate for the team. For example, suppose that one characteristic relates to a desired skill level of opponents. The desired skill level of opponents for each user on a team may be averaged and then compared to the skill level of individual users on the opposite team or in the aggregate. The engagement score for the match plan may be calculated by aggregating and/or averaging the engagement scores for each of the teams.

At decision block 812, the user matching system 132 determines whether the engagement scores calculated at block 810 satisfy a threshold score. In some cases, the decision block 812 determines whether the engagement score for the match plan satisfies a match plan score threshold. Alternatively, or in addition, the decision block 812 determines whether one or more engagement scores relating to the selection of users as teammates and/or the selection of users as opponents matches an engagement score threshold, which may or may not differ from the match plan score threshold.

If it is determined at the decision block 812 that the one or more engagement scores calculated at block 810 match the corresponding engagement score thresholds, the user matching system 132 initiates a playable instance of the video game using the match plan 814. In some embodiments, initiating the playable instance of the video game may include providing the identity of the users to the application host system 138 to initiate the video game 112 or the match with the selected teams of users. Further, in some embodiments, the block 814 may include one or more of the embodiments previously described with respect to block 610.

If it is determined at the decision block 812 that at least one engagement score calculated at block 810 does not match a corresponding engagement score threshold, the user matching system 132 determines whether a match selection time has exceeded a time threshold at decision block 816. If so, the process 800 proceeds to block 814 using the current match plan or the match plan with the highest match plan engagement score.

If it is determined at decision block 816 that the match selection time has not exceeded the time threshold, the process 800 returns to block 808 where an alternative match plan is generated. Generating the alternative match plan may include replacing one or more users from the original or previous match plan with different users included in the users selected in block 802. In some cases, the user matching system 132 may replace the one or more users with an engagement score that is farthest from the engagement score threshold. In other cases, the user matching system 132 may replace users at random or using a particular user selection algorithm. If the user matching system 132 does not identify a match plan that satisfies the engagement score thresholds, the user matching system 132 may increase or adjust the number of players selected at block 802. Alternatively, or in addition, the user matching system 132 may replace one or more players selected at block 802 with other players in the queue.

In certain embodiments, the user matching system 132 may select users at random or using a particular selection algorithm to play one or more instances of the video game 112. The user matching system 132 may periodically select users without using the process 800 in order to, for example, generate or confirm the accuracy of the users clusters and the user characteristics used to generate match plans.

Overview of Computing System

Figure 9:
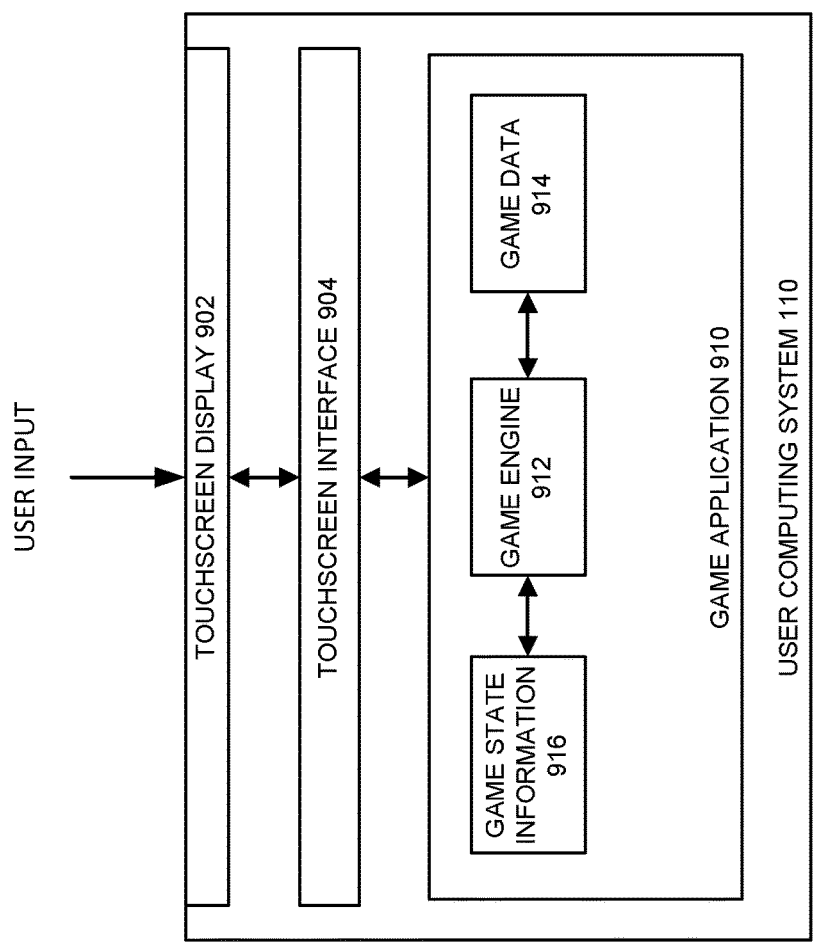
FIG. 9 illustrates an embodiment of a user computing system.

FIG. 9 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 9, the user computing system 110 is a touch-capable computing device capable of receiving input from a user via a touchscreen display 902. However, the user computing system 110 is not limited as such and may include non-touch capable embodiments, which do not include a touchscreen display 902.

The user computing system 110 includes a touchscreen display 902 and a touchscreen interface 904, and is configured to execute a game application 910. This game application may be the video game 112 or an application that executes in conjunction with or in support of the video game 112, such as a video game execution environment. Although described as a game application 910, in some embodiments the application 910 may be another type of application that may have a variable execution state based at least in part on the preferences or capabilities of a user, such as educational software. While user computing system 110 includes the touchscreen display 902, it is recognized that a variety of input devices may be used in addition to or in place of the touchscreen display 902.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 910. For example, the user computing system 110 may be a video game console. The game applications 910 executed by the user computing system 110 may be created using a particular application programming interface (API) or compiled into a particular instruction set that may be specific to the user computing system 110. In some embodiments, the user computing system 110 may be a general purpose computing device capable of executing game applications 910 and non-game applications. For example, the user computing system 110 may be a laptop with an integrated touchscreen display or desktop computer with an external touchscreen display. Components of an example embodiment of a user computing system 110 are described in more detail with respect to FIG. 8.

The touchscreen display 902 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 902. The touchscreen interface 904 can be configured to translate the touch input into data and output the data such that it can be interpreted by components of the user computing system 110, such as an operating system and the game application 910. The touchscreen interface 904 can translate characteristics of the tactile touch input touch into touch input data. Some example characteristics of a touch input can include, shape, size, pressure, location, direction, momentum, duration, and/or other characteristics. The touchscreen interface 904 can be configured to determine the type of touch input, such as, for example a tap (for example, touch and release at a single location) or a swipe (for example, movement through a plurality of locations on touchscreen in a single touch input). The touchscreen interface 904 can be configured to detect and output touch input data associated with multiple touch inputs occurring simultaneously or substantially in parallel. In some cases, the simultaneous touch inputs may include instances where a user maintains a first touch on the touchscreen display 902 while subsequently performing a second touch on the touchscreen display 902. The touchscreen interface 904 can be configured to detect movement of the touch inputs. The touch input data can be transmitted to components of the user computing system 110 for processing. For example, the touch input data can be transmitted directly to the game application 910 for processing.

In some embodiments, the touch input data can undergo processing and/or filtering by the touchscreen interface 904, an operating system, or other components prior to being output to the game application 910. As one example, raw touch input data can be captured from a touch input. The raw data can be filtered to remove background noise, pressure values associated with the input can be measured, and location coordinates associated with the touch input can be calculated. The type of touch input data provided to the game application 910 can be dependent upon the specific implementation of the touchscreen interface 904 and the particular API associated with the touchscreen interface 904. In some embodiments, the touch input data can include location coordinates of the touch input. The touch signal data can be output at a defined frequency. Processing the touch inputs can be computed many times per second and the touch input data can be output to the game application for further processing.

A game application 910 can be configured to be executed on the user computing system 110. The game application 810 may also be referred to as a video game, a game, game code and/or a game program. A game application should be understood to include software code that a user computing system 110 can use to provide a game for a user to play. A game application 910 might comprise software code that informs a user computing system 110 of processor instructions to execute, but might also include data used in the playing of the game, such as data relating to constants, images and other data structures. For example, in the illustrated embodiment, the game application includes a game engine 912, game data 914, and game state information 916.

The touchscreen interface 904 or another component of the user computing system 110, such as the operating system, can provide user input, such as touch inputs, to the game application 910. In some embodiments, the user computing system 110 may include alternative or additional user input devices, such as a mouse, a keyboard, a camera, a game controller, and the like. A user can interact with the game application 910 via the touchscreen interface 904 and/or one or more of the alternative or additional user input devices. The game engine 912 can be configured to execute aspects of the operation of the game application 910 within the user computing system 110. Execution of aspects of gameplay within a game application can be based, at least in part, on the user input received, the game data 914, and game state information 916. The game data 914 can include game rules, prerecorded motion capture poses/paths, environmental settings, constraints, animation reference curves, skeleton models, and/or other game application information. Further, the game data 914 may include information that is used to set or adjust the difficulty of the game application 910.

The game engine 912 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 910, the game application 910 can store game state information 916, which can include character states, environment states, scene object storage, and/or other information associated with a state of execution of the game application 910. For example, the game state information 916 can identify the state of the game application at a specific point in time, such as a character position, character action, game level attributes, and other information contributing to a state of the game application.

The game engine 912 can receive the user inputs and determine in-game events, such as actions, collisions, runs, throws, attacks and other events appropriate for the game application 910. During operation, the game engine 912 can read in game data 914 and game state information 916 in order to determine the appropriate in-game events. In one example, after the game engine 912 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration Of Computing System

Figure 10:
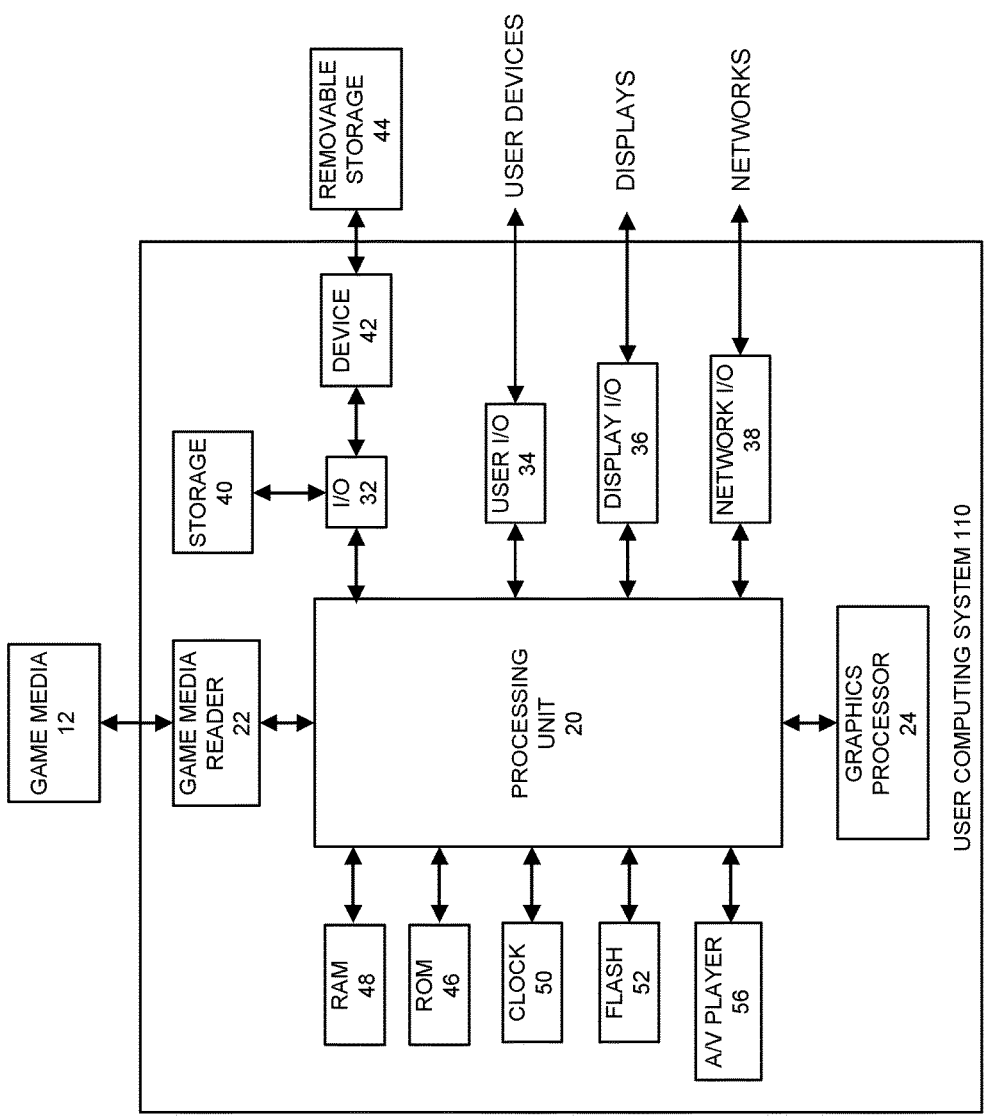
FIG. 10 illustrates an embodiment of a hardware configuration for the user computing system of FIG. 9.

FIG. 10 illustrates an embodiment of a hardware configuration for the user computing system 110 of FIG. 9. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 8) as described with respect to FIG. 9, the user computing system 110 may optionally include a touchscreen display 902 and a touchscreen interface 904.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 800. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 800.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

In certain embodiments, a computer-implemented method is disclosed that may be implemented by an interactive computing system configured with specific computer-executable instructions to at least select a plurality of users from a queue of users waiting to play an instance of a video game. At least a first portion of the instance of the video game may execute on a user computing device of at least one user from the queue of users and a second portion of the instance of the video game may execute on the interactive computing system. For a first user from the plurality of users, the method may include identifying a first user cluster associated with the first user from a plurality of user clusters based at least in part on a first user identity of the first user. The first user cluster may be associated with a first set of matchmaking preferences for the video game. For a second user from the plurality of users, the method may include identifying a second user cluster associated with the second user from the plurality of user clusters based at least in part on a second user identity of the second user. The second user cluster may be associated with a second set of matchmaking preferences for the video game. In some cases, the method may include selecting the first user and the second user from the plurality of users based at least in part on the first set of matchmaking preferences and the second set of matchmaking preferences. Further, the method may include initiating the instance of the video game with the first user and the second user as players of the instance of the video game.

In some embodiments, the first set of matchmaking preferences and the second set of matchmaking preferences relate to opponent preferences and the first user and the second user are designated as opponents in the instance of the video game. In other embodiments, the first set of matchmaking preferences and the second set of matchmaking preferences relate to teammate preferences and the first user and the second user are designated as teammates in the instance of the video game. In some cases, the plurality of users comprises a subset of users included in the queue of users, and the plurality of users is selected based on one or more selection criteria. Further, the selection criteria may include one or more of the following: length of time of a user in the queue, geographic location of the user; inclusion on a blacklist of the user; geographic distance from a host server of the interactive computing system that hosts the second portion of the instance of the video game; or network distance from the host server. In some cases, the first set of matchmaking preferences and the second set of matchmaking preferences are the same.

In certain implementations, selecting the first user and the second user from the plurality of users comprises determining a first engagement score for the first user based at least in part on the first set of matchmaking preferences and a first set of characteristics associated with the second user. Further, the method may include determining a second engagement score for the second user based at least in part on the second set of matchmaking preferences and a second set of characteristics associated with the first user. In addition, the method may include aggregating the first engagement score and the second engagement score to obtain an aggregated engagement score and determining whether the aggregated engagement score satisfies an engagement threshold. In response to determining that the aggregated engagement score satisfies the engagement threshold, the method may include selecting the first user and the second user from the plurality of users. In some cases, the first set of characteristics and the second set of characteristics include one or more of the following: a play style; a skill level; or a desired opponent skill level. Moreover, the first engagement score may correspond inversely to a probability that the first user ceases to play the video game, the second engagement score may correspond inversely to a probability that the second user ceases to play the video game, and the aggregated engagement score may correspond inversely to a probability that at least one of the first user or the second user ceases to play the video game.

In some embodiments, selecting the first user and the second user from the plurality of users comprises receiving an indication that a third user and the first user are to be assigned to the same instance of the video game. Further, the method may include determining a first engagement score based at least in part on the first set of matchmaking preferences, a third set of matchmaking preferences associated with the third user, and a first set of characteristics associated with the second user. Moreover, the method may include determining a second engagement score based at least in part on the second set of matchmaking preferences, a second set of characteristics associated with the first user, and a third set of characteristics associated with the third user. The method may further include aggregating the first engagement score and the second engagement score to obtain an aggregated engagement score, and determining whether the aggregated engagement score satisfies an engagement threshold. In response to determining that the aggregated engagement score satisfies the engagement threshold, the method may include selecting the first user, the second user, and the third user from the plurality of users. In some cases, the method may further include associating the first user with the first user cluster based at least in part on user interaction data obtaining by monitoring the first user's interaction with the video game over a time period.

Additional embodiments of the present disclosure relate to a system that includes an electronic data store configured to store user cluster data for users of a video game and a hardware processor in communication with the electronic data store. The hardware processor may be configured to execute specific computer-executable instructions to at least select a set of users from a queue of users waiting to play a video game. At least a first portion of the video game may be hosted on a user computing device of at least one user from the queue of users and a second portion of the video game is hosted by a server system. Further, the system may generate a number of match plans based on the set of users. Each match plan can include a first team of users from the set of users and a second team of users from the set of users. For each match plan from the number of match plans, the system can generate a first engagement score for the first team of users based at least in part on matchmaking preferences associated with at least some users of the first team of users and characteristic data associated with at least some users of the second team of users, the matchmaking preferences and the characteristic data obtained from the user cluster data. Moreover, the system can generate a second engagement score for the second team of users based at least in part on matchmaking preferences associated with at least some users of the second team of users and characteristic data associated with at least some users of the first team of users. In some cases, the system may determine whether the first engagement score and the second engagement score for at least one match plan from the number of match plans satisfies an engagement score threshold. In response to determining that the first engagement score and the second engagement score for the at least one match plan from the number of match plans satisfies the engagement score threshold, the system may select a match plan that satisfies the engagement score threshold from the number of match plans for the video game.

In some implementations, in response to determining that the first engagement score and the second engagement score for at least one match plan from the number of match plans satisfies the engagement score threshold, the hardware processor is further configured to execute specific computer-executable instructions to at least select the match plan with the highest engagement score. Further, in response to determining that the first engagement score and the second engagement score for at least one match plan from the number of match plans does not satisfy the engagement score threshold, the hardware processor may be further configured to execute specific computer-executable instructions to at least substitute at least one user from the set of users with another user from the queue of users. Moreover, at least a first user and a second user may be designated as a user pair, and generating the number of match plans may include maintaining the first user and the second user on the first team of users for each of the number of match plans. Further, the engagement score threshold may vary based at least in part on the number of users included in the queue of users.

In another aspect of the present disclosure, a non-transitory computer-readable storage medium is disclosed that may store computer executable instructions that, when executed by one or more computing devices, configure the one or more computing devices to perform operations comprising selecting a plurality of users from a queue of users waiting to play a video game. For a first user from the plurality of users, the operations may include identifying a first user cluster associated with the first user from a plurality of user clusters based at least in part on a first user identity of the first user. The first user cluster may be associated with a first set of matchmaking preferences for the video game. For a second user from the plurality of users, the operations may include identifying a second user cluster associated with the second user from the plurality of user clusters based at least in part on a second user identity of the second user. The second user cluster may be associated with a second set of matchmaking preferences for the video game. Further, the operations may include selecting the first user from the plurality of users based at least in part on the second set of matchmaking preferences and the second user from the plurality of users based at least in part on the first set of matchmaking preferences.

In certain embodiments, the operations further comprise initiating a play session of the video game with the first user and the second user. Further the operations may further comprise associating the first user with the first user cluster by at least obtaining user interaction data for the first user by at least monitoring the first user's access of the video game over a time period. Moreover, the operations may include determining matchmaking preferences associated with the first user based at least in part on the user interaction data and accessing cluster definitions for the plurality of user clusters. Each cluster definition may identify a number of matchmaking preferences for users associated with the corresponding user cluster. In addition, the operations may include selecting the first user cluster from the plurality of user clusters by matching to at least a threshold degree the matchmaking preferences for the first user with the number of matchmaking preferences of the cluster definition associated with the first user cluster. In addition, the operations may include associating the first user with the first user cluster.

In some embodiments, selecting the first user and the second user from the plurality of users comprises determining a first engagement score for the first user based at least in part on the first set of matchmaking preferences and a first set of characteristics associated with the second user. Moreover, the operations may include determining a second engagement score for the second user based at least in part on the second set of matchmaking preferences and a second set of characteristics associated with the first user. Additionally, the operations can include determining whether the first engagement score satisfies an engagement threshold and determining whether the second engagement score satisfies the engagement threshold. The operations may further include, in response to determining that the first engagement score satisfies the engagement threshold and the second engagement score satisfies the engagement threshold, selecting the first user and the second user from the plurality of users.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
   an electronic data store configured to store user interaction data for users of a video game;
   a hardware processor in communication with the electronic data store, the hardware processor configured to execute specific computer-executable instructions to at least:
      select a set of users from a queue of users waiting to play a video game, wherein at least a first portion of the video game is hosted on a user computing device of at least one user from the queue of users and a second portion of the video game is hosted by a server system;
      generate a match plan based on the set of users, wherein each match plan comprises a first team of users from the set of users and a second team of users from the set of users;
      for each user from the set of users, access a set of user interaction data associated with the user;
      determine an engagement score for the match plan based at least in part on the set of user interaction data associated with each of the users from the set of users;
      determine whether the engagement score satisfies an engagement score threshold;
      in response to determining that the engagement score satisfies the engagement score threshold, initiate an instance of the video game using the match plan; and
      in response to determining that the engagement score does not satisfy the engagement score threshold, substitute at least one user from the set of users with another user from the queue of users, wherein at least a first user and a second user from the set of users are designated as a user pair to be selected to play in a same instance of the video game, and wherein substituting at least one user from the set of users with another user from the queue of users includes maintaining the user pair as users within the set of users.

2. The system of claim 1, wherein the match plan is one of a plurality of match plans, and wherein the hardware processor is further configured to execute specific computer-executable instructions to at least select the match plan from the plurality of match plans based at least in part on each match plan's engagement score.

3. The system of claim 1, wherein the engagement score threshold varies based at least in part on the number of users included in the queue of users.

4. A computer-implemented method comprising:
   as implemented by an interactive computing system configured with specific computer-executable instructions,
      selecting a set of users from a queue of users waiting to play a video game, wherein at least a first portion of the video game is hosted on a user computing device of at least one user from the queue of users and a second portion of the video game is hosted by a server system;
      generating a match plan based on the set of users, wherein each match plan comprises a first team of users from the set of users and a second team of users from the set of users;
      for each user from the set of users, accessing a set of user interaction data associated with the user;

determining an engagement score for the match plan based at least in part on the set of user interaction data associated with each of the users from the set of users;

determining whether the engagement score satisfies an engagement score threshold;

in response to determining that the engagement score satisfies the engagement score threshold, initiating an instance of the video game using the match plan; and in response to determining that the engagement score does not satisfy the engagement score threshold, substituting at least one user from the set of users with another user from the queue of users, wherein at least a first user and a second user from the set of users are designated as a user pair to be selected to play in a same instance of the video game, and wherein substituting at least one user from the set of users with another user from the queue of users includes maintaining the user pair as users within the set of users.

5. The computer-implemented method of claim 4, wherein the match plan is one of a plurality of match plans, and wherein the method further comprises selecting the match plan from the plurality of match plans based at least in part on each match plan's engagement score.

6. The computer-implemented method of claim 4, wherein the engagement score threshold varies based at least in part on the number of users included in the queue of users.

7. A non-transitory computer-readable storage medium storing computer executable instructions that, when executed by one or more computing devices, configure the one or more computing devices to perform operations comprising:

selecting a set of users from a queue of users waiting to play a video game, wherein at least a first portion of the video game is hosted on a user computing device of at least one user from the queue of users and a second portion of the video game is hosted by a server system;

generating a match plan based on the set of users, wherein each match plan comprises a first team of users from the set of users and a second team of users from the set of users;

for each user from the set of users, accessing a set of user interaction data associated with the user;

determining an engagement score for the match plan based at least in part on the set of user interaction data associated with each of the users from the set of users;

determining whether the engagement score satisfies an engagement score threshold;

in response to determining that the engagement score satisfies the engagement score threshold, initiating an instance of the video game using the match plan; and in response to determining that the engagement score does not satisfy the engagement score threshold, substituting at least one user from the set of users with another user from the queue of users, wherein at least a first user and a second user from the set of users are designated as a user pair to be selected to play in a same instance of the video game, and wherein substituting at least one user from the set of users with another user from the queue of users includes maintaining the user pair as users within the set of users.

8. The computer-readable, non-transitory storage medium of claim 7, wherein the match plan is one of a plurality of match plans, and wherein the operations further comprise selecting the match plan from the plurality of match plans based at least in part on each match plan's engagement score.

9. The computer-readable, non-transitory storage medium of claim 7, wherein the engagement score threshold varies based at least in part on the number of users included in the queue of users.

* * * * *